US012804129B2

(12) United States Patent
Wang

(10) Patent No.: US 12,804,129 B2
(45) Date of Patent: Nov. 17, 2026

(54) INTRA PREDICTION METHOD AND DECODER

(71) Applicant: GUANGDONG OPPO MOBILE TELECOMMUNICATIONS CORP., LTD., Dongguan (CN)

(72) Inventor: Fan Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 32 days.

(21) Appl. No.: 18/450,377

(22) Filed: Aug. 15, 2023

(65) Prior Publication Data

US 2023/0403392 A1 Dec. 14, 2023

Related U.S. Application Data

(63) Continuation of application No. PCT/CN2021/077324, filed on Feb. 22, 2021.

(51) Int. Cl.

| | |
|---|---|
| ***H04N 19/105*** | (2014.01) |
| ***H04N 19/159*** | (2014.01) |
| ***H04N 19/176*** | (2014.01) |

(52) U.S. Cl.

CPC ......... *H04N 19/105* (2014.11); *H04N 19/159* (2014.11); *H04N 19/176* (2014.11)

(58) Field of Classification Search

None

See application file for complete search history.

(56) References Cited

U.S. PATENT DOCUMENTS

| | | | | |
|---|---|---|---|---|
| 9,609,343 | B1 | 3/2017 | Chen et al. | |
| 2021/0409727 | A1* | 12/2021 | Jang | H04N 19/46 |

(Continued)

FOREIGN PATENT DOCUMENTS

| | | |
|---|---|---|
| CN | 111373750 | 7/2020 |
| CN | 111937390 | 11/2020 |

(Continued)

OTHER PUBLICATIONS

Bross et al., "Versatile Video Coding Editorial Refinements on Draft 10," Joint Video Experts Team (JVET) of ITU-T SG 16 WP 3 and ISO/IEC JTC 1/SC 29, JVET-T2001-v1, Oct. 2020.

(Continued)

*Primary Examiner* — Samuel D Fereja

(74) *Attorney, Agent, or Firm* — Hodgson Russ LLP

(57) ABSTRACT

A decoder decodes a bitstream to determine an intra prediction mode parameter of a current block. When the intra prediction mode parameter indicates that an IWCP mode is used for determining an intra prediction value of the current block, a first mode index and a second mode index of the current block are determined. An MPM list for the current block is constructed. A first intra prediction mode and a second intra prediction mode of the current block are determined according to the first mode index, the second mode index, and the MPM list. The first intra prediction mode and the second intra prediction mode are two different intra angular prediction modes. A weight matrix for the current block is determined. A prediction value of the current block is determined based on the first intra prediction mode, the second intra prediction mode, and the weight matrix.

18 Claims, 7 Drawing Sheets

(56) References Cited

U.S. PATENT DOCUMENTS

| | | | | |
|---|---|---|---|---|
| 2022/0201279 A1* | 6/2022 | Choi | .................... | H04N 19/176 |
| 2022/0417503 A1* | 12/2022 | Deng | .................... | H04N 19/132 |
| 2024/0314305 A1* | 9/2024 | Pfaff | .................... | H04N 19/176 |

FOREIGN PATENT DOCUMENTS

| | | |
|---|---|---|
| CN | 112385234 | 2/2021 |
| EP | 4258658 | 10/2023 |
| JP | 2013524670 | 6/2013 |
| JP | 2019216294 | 12/2019 |
| TW | 202107893 | 2/2021 |
| WO | 2020096389 | 5/2020 |
| WO | 2020211807 | 10/2020 |
| WO | 2020251329 | 12/2020 |

OTHER PUBLICATIONS

"AVS3—Part 2 : Video," Working Group discussion draft, National Standards of the People's Republic of China, Aug. 2020.
WIPO, International Search Report and Written Opinion for International Application No. PCT/CN2021/077324, Nov. 5, 2021.
Chujoh et al., "Description of video coding technology proposal by Toshiba," Joint Collaborative Team on Video Coding (JCT-VC) of ITU-T SG16 WP3 and ISO/IEC JTC1/SC29/WG11, Document: JCTVC-A117r1, Apr. 2010.
JPO, Office Action for JP Application No. 2023-549679, Jan. 28, 2025.
Chen et al., "Algorithm description for Versatile Video Coding and Test Model 11 (VTM 11)," Joint Video Experts Team (JVET) of ITU-T SG 16 WP 3 and ISO/IEC JTC I/SC 29, JVET-T2002-v2, Oct. 2020.
Helle et al., "CE3: Non-linear weighted intra prediction (tests 2.2.1 and 2.2.2)," Joint Video Experts Team (JVET) of ITU-T SG 16 WP 3 and ISO/IEC JTC 1/SC 29/WG11, JVET-L0199-v2, Oct. 2018.
EPO, Extended European Search Report for EP Application No. 21926184.9, Oct. 31, 2024.
EPO, Communication for EP Application No. 21926184.9, Jul. 16, 2025.
EPO, Summons to attend oral proceedings for EP Application No. 21926184.9, Jan. 21, 2026.
JPO, Office Action for JP Application No. 2025-120280, Mar. 3, 2026.
IPI, Office Action for IN Application No. 202317062806, Apr. 1, 2026.
IMPI, Office Action for MX Application No. MX/a/2023/009740, Mar. 17, 2026.

* cited by examiner

INTRA PREDICTION METHOD AND DECODER

CROSS-REFERENCE TO RELATED APPLICATION(S)

This application is a continuation of International Application No. PCT/CN2021/077324, filed Feb. 22, 2021, the entire disclosure of which is hereby incorporated by reference.

TECHNICAL FIELD

Implementations of the disclosure relates to the field of image processing technology, and in particular to an intra prediction method and a decoder.

BACKGROUND

In order to capture finer edge directions presented in natural videos, 33 intra luma prediction angular modes defined in a video compress standard high efficiency video coding (HEVC) are extended to 65 modes in versatile video coding (VVC), with two additional non-angular modes, namely Planar mode with index 0 and direct current (DC) mode with index 1.

In order to improve the accuracy of intra prediction, an intra prediction method using two different intra prediction modes is currently proposed. However, in hardware implementation, circuits for some different intra prediction modes cannot be reused, so two sets of intra prediction circuits are required. However, adding new prediction circuits will increase the cost and complexity of the hardware implementation and reduce coding performance.

SUMMARY

In a first aspect, an intra prediction method is provided in implementations of the disclosure. The method is applied to a decoder and includes the following. A bitstream is decoded to determine an intra prediction mode parameter of a current block. A first mode index and a second mode index are determined when the intra prediction mode parameter indicates that an intra weighted combined prediction mode is used for determining an intra prediction value of the current block. A most probable mode (MPM) list for the current block is determined. A first intra prediction mode and a second intra prediction mode of the current block are determined according to the first mode index, the second mode index, and the MPM list, where the first intra prediction mode and the second intra prediction mode are two different intra angular prediction modes. A weight matrix for the current block is determined, and a prediction value of the current block is determined based on the first intra prediction mode, the second intra prediction mode, and the weight matrix.

In a second aspect, an intra prediction method is provided in implementations of the disclosure. The method is applied to an encoder and includes the following. A first intra prediction mode and a second intra prediction mode of a current block are determined when an intra weighted combined prediction mode is used for determining an intra prediction value of the current block, where the first intra prediction mode and the second intra prediction mode are two different intra angular prediction modes. An MPM list for the current block is constructed. A first mode index and a second mode index of the current block are determined according to the first intra prediction mode, the second intra prediction mode, and the MPM list. The first mode index and the second mode index are signalled into a bitstream.

In a third aspect, a decoder is provided in implementations of the disclosure. The decoder includes a processor and a memory storing instructions executable by the processor. When the instructions are executed by the processor, the processor performs the above intra prediction method of the first aspect.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

DETAILED DESCRIPTION

Figure 1:
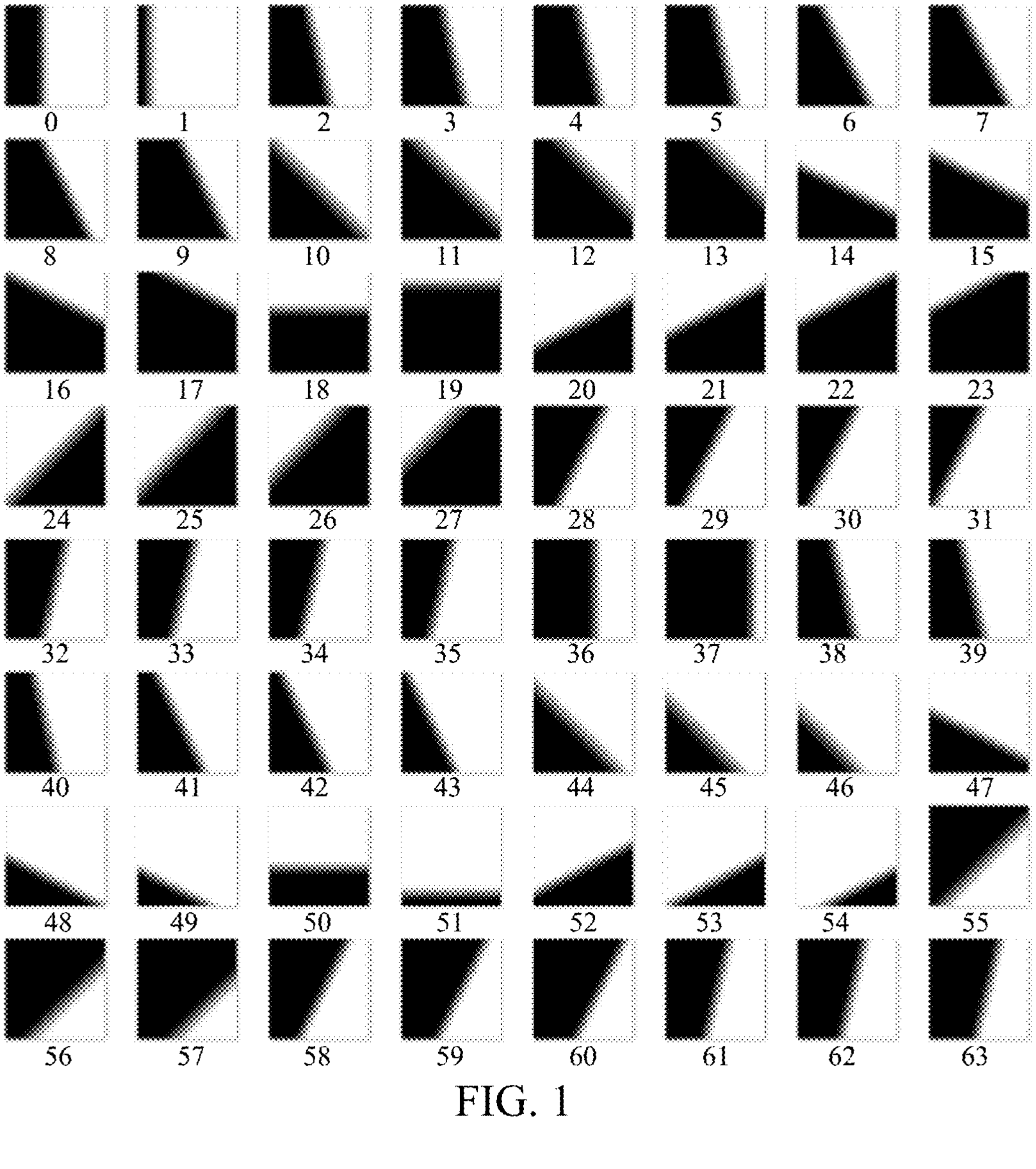
FIG. 1 is a first schematic diagram illustrating weight allocation.

Implementations of the disclosure will be described in a clear and complete manner with reference to the accompanying drawings. It should be understood that the specific implementations described herein are only for explaining the relevant disclosure and should not be construed as limiting the scope of the disclosure. Additionally, it should be noted that, for ease of description, only the parts related to the relevant disclosure are illustrated in the drawings.

Currently, universal video coding standards generally use block-based hybrid coding frameworks. Each picture of a video is partitioned into largest coding units (LCUs), which are squares of equal size (e.g., 128×128, 64×64, etc.). Each LCU may also be partitioned into rectangular coding units (CUs) according to certain rules. Furthermore, the CU may be partitioned into smaller prediction units (PUs). In detail, the hybrid coding framework may include modules for such as prediction, transformation, quantization, entropy coding, and in-loop filter. The prediction module may include intra prediction and inter prediction, and the inter prediction may include motion estimation and motion compensation. Since there is strong correlation among neighbouring samples in a video picture, using intra prediction in video coding can eliminate spatial redundancy between neighbouring samples. Moreover, since there is also strong similarity between neighbouring pictures in the video, using inter prediction in video coding can eliminate temporal redundancy between neighbouring pictures. Thus coding efficiency can be improved.

The basic process performed by a video codec is as follows. At the encoding side, a picture is partitioned into blocks, and a prediction block of a current block is generated using intra prediction or inter prediction. An original block of the current block is subtracted from the prediction block to obtain a residual block, which is then subjected to transformation and quantization to generate a quantization coefficient matrix that is entropy-encoded and signalled into a bitstream. At the decoding side, the prediction block for the current block is generated using intra prediction or inter prediction, and at the same time, the quantization coefficient matrix is parsed out from the bitstream. The quantization coefficient matrix is inverse-quantized and inverse-transformed to obtain the residual block, which is added to the prediction block to obtain a reconstructed block. Reconstructed blocks form a reconstructed picture, which is loop-filtered based on the picture or blocks to obtain a decoded picture. The encoding side also requires similar operations to obtain the decoded picture. The decoded picture may be used as a reference picture in inter prediction for subsequent pictures. The block partition information and mode information or parameter information (such as for prediction, transformation, quantization, entropy coding, and in-loop filtering) determined at the encoding side, may need to be output to the bitstream if necessary. The decoding side determines the same block partition information and mode information or parameter information such as for prediction, transformation, quantization, entropy coding, and in-loop filtering as the encoding side through parsing and analysis based on available information, ensuring that the decoded picture obtained by the encoding side is the same as that obtained by the decoding side. The decoded picture obtained by the encoding side is typically called the reconstructed picture. During prediction, the current block may be partitioned into PUs, and during transformation, the current block may be partitioned into TUs. The partition for PUs and TUs may be different. The above is the basic process performed by the video codec under the block-based hybrid coding framework. With the development of technologies, some modules or steps in this framework or process may be optimized. The implementations of the disclosure are applicable to the basic process performed by the video codec under the block-based hybrid coding framework, but is not limited to this framework or process.

The current block may be the current coding unit (CU) or the current prediction unit (PU), etc.

Inter prediction uses information from the decoded or reconstructed picture, also known as a reference picture, to predict the current block. Motion information is used to find a reference block in the reference picture and generate a prediction block based on the reference block. The motion information includes a reference picture list, a reference picture index, and a motion vector. The motion vector may be either per integer-sample or per fractional-sample. If the motion vector is per fractional-sample, interpolation filtering is needed in the reference picture to obtain a required fractional-sample block. The integer-sample or fractional-sample block found in the reference picture based on the motion vector is called a reference block. The reference block may be directly used as a prediction block in some techniques, or may be further processed to generate the prediction block in some other techniques. The process of processing the reference block to generate the prediction block may also be understood as using the reference block as a prediction block and then processing the prediction block to generate a new prediction block.

In the video coding standard Versatile Video Coding (VVC) currently under development, there is an inter prediction mode called geometric partitioning mode (GPM). In the video coding standard Audio Video coding Standard (AVS) currently under development, there is an inter prediction mode called angular weighted prediction (AWP) mode. Although these two modes have different names and implementation details, they share common principles.

It should be noted that traditional unidirectional prediction only searches for one reference block of the same size as the current block, while traditional bidirectional prediction uses two reference blocks of the same size as the current block, where a sample value of each sample in the prediction block is an average of samples at corresponding positions in the two reference blocks, that is, all samples in each reference block account for (or contribute) 50%. Bidirectional weighted prediction allows the proportions of the two reference blocks to be different, such as 75% for all samples in the first reference block and 25% for all samples in the second reference block. However, the proportions of all samples in the same reference block are the same. Other optimization methods, such as decoder-side motion vector refinement (DMVR) technology, bi-directional optical flow (BIO), etc., may cause some changes in the reference or prediction samples. In GPM or AWP, two reference blocks of the same size as the current block are also used, but in some sample positions 100% of the sample values at the corresponding positions in first reference block are used, in some sample positions 100% of the sample values at the corresponding positions in the second reference block are used, and in a boundary area, the sample values at the corresponding positions in these two reference blocks are used according to a certain proportion (weight). The allocation of these weights is determined by the prediction mode of GPM or AWP.

Figure 2:
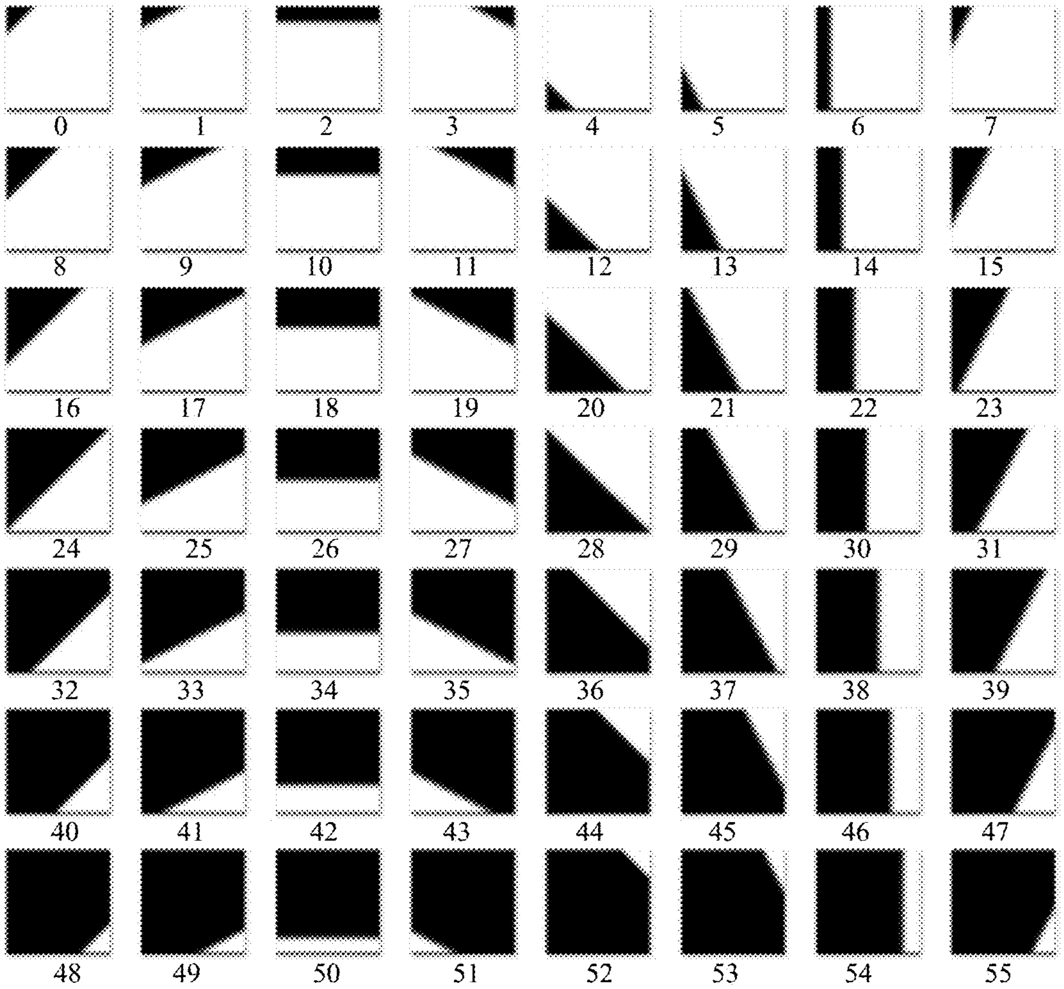
FIG. 2 is a second schematic diagram illustrating weight allocation.

As an example, FIG. 1 is a first schematic diagram illustrating weight allocation. FIG. 1 is a schematic diagram illustrating weight allocation for multiple partition modes of GPM on a 64×64 current block provided in implementations of the disclosure, where GPM has 64 partition modes. FIG. 2 is a second schematic diagram illustrating weight allocation. FIG. 2 is a schematic diagram illustrating weight allocation for multiple partition modes of AWP on a 64×64 current block provided in implementations of the disclosure, where AWP has 56 partition modes. In both FIG. 1 and FIG. 2, for each partition mode, the black area represents a weight value of 0% for the corresponding positions in the first reference block, while the white area represents a weight value of 100% for the corresponding positions in the first reference block. The grey area represents a weight value greater than 0% and less than 100%, represented by the color depth, for the corresponding positions in the first reference block. A weight value for a position in the second reference block is 100% minus a weight value for the corresponding position in the first reference block.

Methods for deriving the weights are different for GPM and AWP. For GPM, an angle and an offset amount are determined according to each mode, and then a weight matrix for each mode is calculated. For AWP, a one-dimensional weight line is first defined, and then a method similar to intra angular prediction is used to fill the entire matrix with the one-dimensional weight line.

It should be noted that in earlier coding technologies, only rectangular partitioning was available, whether for CU, PU, or TU partitioning. However, GPM or AWP achieves the effect of non-rectangular partitioning for prediction without actual partitioning. GPM and AWP use a weight mask for two reference blocks, namely the weight map. From the mask, the weights of the two reference blocks in generating the prediction block are determined, and the blending area is obtained by weighting the corresponding positions in the two reference blocks, which allows a smoother transition. Neither GPM nor AWP partitions the current block into two CUs or PUs according to a partition line. Therefore, after prediction, the current block is processed as a whole during transformation, quantization, inverse transformation, and inverse quantization of the residuals.

The motion information used for the current block may be stored. The subsequent coding blocks of the current picture may use the motion information of previously coded blocks, such as the neighboring blocks, based on positional relationship. This utilizes spatial correlation, so this kind of coded motion information is called spatial motion information. The motion information used for each block of the current picture may be stored. The subsequent coding picture may use the motion information of previously coded picture based on reference relationship. This utilizes temporal correlation, so this kind of motion information of coded picture is called temporal motion information. In the method of storing the motion information used for each block in the current picture, a fixed-size matrix such as a 4×4 matrix is usually taken as a minimum unit, and each minimum unit stores a set of motion information separately. As each block is coded, the minimum unit(s) corresponding to the block position may store the motion information of that block. As such, when the spatial motion information or temporal motion information is used, the corresponding motion information of a position may be directly found according to the position. For example, if traditional unidirectional prediction is used for a 16×16 block, all 4×4 minimum units corresponding to the block will store motion information of this unidirectional prediction. If GPM or AWP is used for a block, all minimum units corresponding to the block will store motion information determined according to the mode of GPM or AWP, first motion information, second motion information, and the position of each minimum unit. In one manner, if all 4×4 samples corresponding to a minimum unit come from the first motion information, the minimum unit stores the first motion information. If all 4×4 samples corresponding to a minimum unit come from the second motion information, the minimum unit stores the second motion information. If all 4×4 samples corresponding to a minimum unit come from both the first and second motion information, in AWP, one of the first and second motion information will be selected for storage, and in GPM, two motion information will be combined as bidirectional motion information if the two motion information point to different reference picture lists; otherwise, only the second motion information will be stored.

It should be noted that GPM or AWP belongs to a type of prediction technique. A flag indicating whether GPM or AWP is used needs to be transmitted in the bitstream, where the flag indicates whether GPM or AWP is used for the current block. If GPM or AWP is used, the encoder needs to transmit the specific mode used, i.e., one of the 64 partition modes of GPM or one of the 56 partition modes of AWP, as well as the index values of two unidirectional motion information, in the bitstream. That is to say, for the current block, the decoder may obtain information about whether GPM or AWP is used by parsing the bitstream. If it is determined that GPM or AWP is used, the decoder may parse out the prediction mode parameters of GPM or AWP and the index values of the two motion information. For example, if the current block is partitioned into two partitions, a first index value corresponding to the first partition and a second index value corresponding to the second partition may be parsed out.

Specifically, for GPM, if GPM is used, the prediction mode parameter of GPM will be transmitted in the bitstream, such as the specific partition mode of GPM. Generally, GPM includes 64 partition modes. For AWP mode, if AWP is used, the prediction mode parameter of AWP will be transmitted in the bitstream, such as the specific partition mode of AWP. Generally, AWP includes 56 partition modes.

In inter prediction mode such as GPM and AWP, two unidirectional motion information are required to search for two reference blocks. At present, this is achieved, at the encoder side, by constructing a unidirectional motion information candidate list using relevant information of the coded part before the current block, selecting unidirectional motion information from the unidirectional motion information candidate list, and signalling indices of these two unidirectional motion information in the unidirectional motion information candidate list into the bitstream. At the decoder side, the same method applies, that is, a unidirectional motion information candidate list is constructed using relevant information of the decoded part before the current block, and this unidirectional motion information candidate list must be identical to the one constructed at the encoder side. As such, the indices of the two unidirectional motion information are parsed out from the bitstream, and these two unidirectional motion information are search out from the unidirectional motion information candidate list as the two unidirectional motion information required for the current block.

In other words, the unidirectional motion information described herein may include motion vector information, which is the value of (x, y), and corresponding reference picture information, which is a reference picture list and a reference picture index in the reference picture list. In one manner, reference picture index values in two reference picture lists are recorded, where index values in one list are valid, such as 0, 1, 2, etc., and index values in the other list are invalid, i.e., −1. The reference picture list with valid reference picture index values is the reference picture list used for the motion information of the current block. The corresponding reference picture may be found in the reference picture list based on the reference picture index value. Each reference picture list has a corresponding motion vector, and the motion vector for the valid reference picture list is valid, while the motion vector for the invalid reference picture list is invalid. The decoder may use the reference picture information in the unidirectional motion information to find the required reference picture, and may find the reference block in the reference picture based on the position of the current block and the motion vector, that is, the value of (x, y), so as to determine the inter prediction value of the current block.

Figure 3:
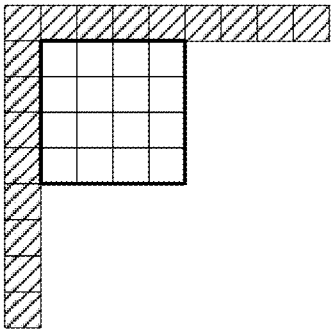
FIG. 3 is a schematic diagram illustrating intra prediction.

In intra prediction, the reconstructed samples that have been coded around the current block are used as reference samples to predict the current block. FIG. 3 is a schematic diagram illustrating intra prediction. As illustrated in FIG. 3, the current block is 4×4 in size, and samples on the left column and the above row of the current block are used as reference samples for intra prediction of the current block. These reference samples may all be available, i.e., they have all been coded. Alternatively, some of the reference samples may not be available. For example, if the current block is on the leftmost of the picture, the reference samples on the left of the current block are not available. For another example, when coding the current block, the samples on the bottom left of the current block have not yet been coded, so the reference samples on the bottom left are also not available. For cases where reference samples are not available, available reference samples, certain values, or certain methods may be used for filling, or no filling may be performed.

Further, in intra prediction, a multiple reference line (MRL) intra prediction method may use more reference samples to improve coding efficiency. For example, four reference rows/columns are used as the reference samples for the current block.

There are multiple prediction modes for intra prediction. In H.264, there are nine modes for intra prediction of 4×4 blocks. In mode 0, samples on the top of the current block can be copied to the current block vertically as prediction values. In mode 1, reference samples on the left of the current block can be copied to the current block horizontally as prediction values. In mode 2 direct current (DC), an average value of neighbouring samples is taken as the prediction values of all samples. In modes 3 to 8, reference samples can be copied to the corresponding positions of the current block according to a certain angle, and since some positions of the current block may not correspond exactly to the reference sample, a weighted average of reference samples or interpolated factional samples of the reference samples may be required.

In addition, there are other modes such as the Planar mode. As the technology develops and the block size increases, there are more and more angular prediction modes. For example, HEVC uses a total of 35 prediction modes, including Planar mode, DC mode, and 33 angular modes. VVC uses a total of 67 prediction modes, including Planar mode, DC mode, and 65 angular modes. AVS3 uses a total of 66 prediction modes, including DC mode, Planar mode, Bilinear mode, and 63 angular modes.

Furthermore, there are some techniques to improve the prediction, such as fractional sample interpolation which improves reference samples, filtering of prediction samples, etc. For example, in the multiple intra prediction filter (MIPF) in AVS3, prediction values are generated using different filters for different block sizes. For different positions of samples within the same block, a filter is used to generate prediction values for samples that are closer to the reference samples, while another filter is used to generate prediction values for samples that are away from the reference samples. The technology of filtering prediction samples, such as Intra prediction Filter (IPF) in AVS3, may filter the prediction values based on the reference samples.

In intra prediction, an intra mode coding technology using a most probable mode (MPM) list may be used to improve the coding efficiency. The MPM list is constructed with intra prediction modes for the surrounding coded blocks, intra prediction modes derived from the intra prediction modes for the surrounding coded blocks, and some commonly-used or high-probability intra prediction modes, such as DC, Planar, and Bilinear modes. Reference to the intra prediction modes of the surrounding coded blocks utilizes spatial correlation because textures have a certain spatial continuity. The MPM(s) may be used as a prediction for intra prediction modes. That is, it is assumed that the probability of using the MPM for the current block is higher than not using the MPM. Therefore, during binarization, fewer codewords will be assigned to the MPM to save the cost and improve coding efficiency.

At present, although intra prediction uses modes such as DC, Planar, and Bilinear modes, these modes can only handle prediction of simple textures. Even with increasing number of angular modes, predictions based on these modes are still constrained within a straight line of a certain angle. Therefore, current intra prediction modes can only handle prediction of simple textures. For prediction of more complex textures, smaller partitioned blocks are required, more residuals need to be encoded, or higher distortion may be generated.

In view of the above problems, an intra prediction method is currently proposed. A codec can determine two different prediction blocks of the current block through two different intra prediction modes, and then combine the prediction blocks through various weight matrices to finally obtain a more complicated prediction block, which improves the prediction accuracy. However, since non-angular prediction modes, such as DC mode, Planar mode, PLANE mode, Bilinear mode and other modes, have different calculation logics from angular prediction modes and each have its own logic, when implemented in hardware, a circuit for a non-angular prediction mode cannot be reused as a circuit for an angular prediction mode. When using two intra prediction modes for prediction, if predictions with the two intra prediction modes are serially performed in the hardware and then combined according to the weight matrix, the existing circuit for intra prediction may be used for each of the predictions with the two intra prediction modes. However, it is necessary to store a prediction value from the first prediction, and the time for intra weighted combined prediction will be significantly higher than the original prediction using only one intra prediction mode. If the two intra prediction modes are used parallel for prediction on the hardware, the speed of generating the prediction value of intra weighted combined prediction is obviously faster than the serial implementation. However, such implementation is at the expense of requiring two sets of intra prediction circuits, that is, requiring one additional set of intra prediction circuits. The intra prediction circuits mentioned herein perform prediction using the above intra non-angular prediction mode and prediction using the above intra angular prediction mode. That is to say, one set of intra prediction circuits needs to be added.

It can be seen that the current intra prediction method using two different intra prediction modes can improve the prediction effect to a certain extent, but increases the cost of hardware implementation due to the need of adding a new prediction circuit. Therefore, simplifying the newly-added intra prediction circuit as much as possible can reduce the complexity brought by the intra weighted combination prediction. In order to solve the above problem, in the implementations of the disclosure, the codec may determine two different prediction blocks of the current block through two different intra angular prediction modes, then combine the two different prediction blocks according to various weight matrices, and finally obtain a more complex prediction block. In this way, the accuracy of intra prediction can be improved, while the cost and complexity of hardware implementation can be reduced, and a simple and efficient coding method can be achieved, thereby improving compression performance.

Figure 4:
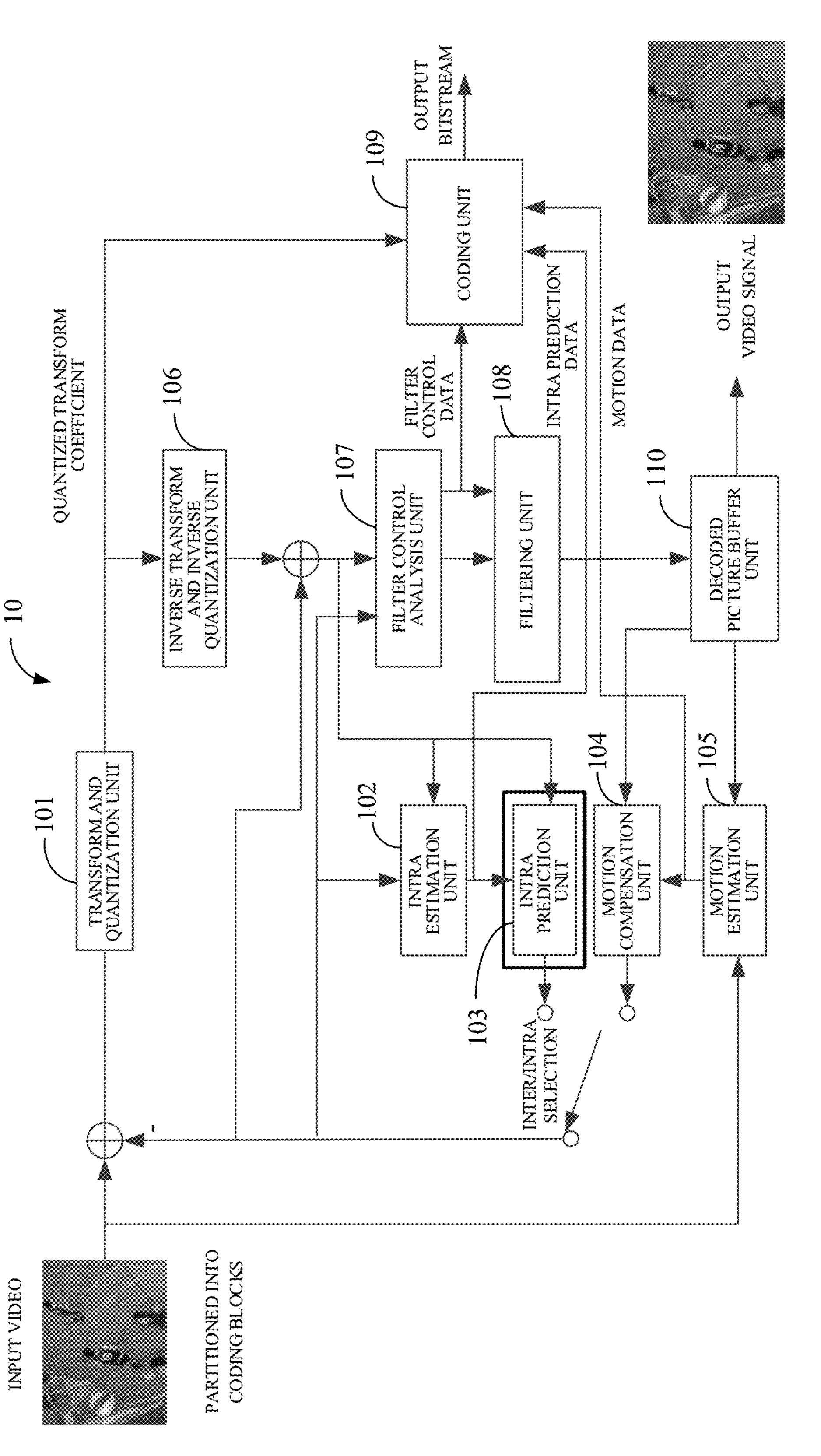
FIG. 4 is a block diagram of components of a video encoding system.

FIG. 4 is a schematic block diagram of a video encoding system provided in implementations of the present disclosure. As illustrated in FIG. 4, the video encoding system 10 includes units such as a transform and quantization unit 101, an intra estimation unit 102, an intra prediction unit 103, a motion compensation unit 104, a motion estimation unit

105, an inverse transform and inverse quantization unit 106, a filter control analysis unit 107, a filtering unit 108, an encoding unit 109, and a decoded picture buffer unit 110. The filtering unit 108 may implement deblocking filtering and Sample Adaptive Offset (SAO) filtering, and the encoding unit 109 may implement header information coding and context-based adaptive binary arithmetic coding (CABAC). An input raw video signal may be partitioned by a coding tree unit (CTU) to obtain a video encoding block. The video encoding block is transformed by the transform and quantization unit 101 processing residual sample information obtained after intra or inter prediction, which includes transforming the residual information from the pixel domain to the transform domain and quantizing the resulting transform coefficients to further reduce the bit rate. The intra estimation unit 102 and intra prediction unit 103 are configured to perform intra prediction on the video encoding block. Specifically, the intra estimation unit 102 and intra prediction unit 103 are configured to determine an intra prediction mode to be used for encoding the video encoding block. The motion compensation unit 104 and motion estimation unit 105 are configured to perform inter prediction coding of the received video encoding block relative to one or more reference blocks within one or more reference pictures, to provide temporal prediction information. The motion estimation performed by the motion estimation unit 105 involves generating a motion vector(s), which can estimate the motion of the video encoding block. Then the motion compensation unit 104 performs motion compensation based on the motion vector determined by the motion estimation unit 105. After determining the intra prediction mode, the intra prediction unit 103 is further configured to provide the selected intra prediction data to the encoding unit 109, and the motion estimation unit 105 also transmits the calculated motion vector data to the encoding unit 109. In addition, the inverse transform and inverse quantization unit 106 is configured to reconstruct the video encoding block by reconstructing a residual block in the pixel domain. The reconstructed residual block is then filtered by the filter control analysis unit 107 and filtering unit 108 to remove blocking effect artifacts, and then the reconstructed residual block is added to a prediction block within a picture in the decoded picture buffer unit 110 to produce the reconstructed video encoding block. The encoding unit 109 is configured to encode various encoding parameters and quantized transform coefficients. In the CABAC-based encoding algorithm, context content may be based on adjacent coding blocks and may be used to encode information indicating the determined intra prediction mode, outputting the bitstream of the video signal. The decoded picture buffer unit 110 is configured to store the reconstructed video encoding blocks for prediction reference. As the video picture encoding progresses, new reconstructed video encoding blocks are continuously generated and stored in the decoded picture buffer unit 110.

Figure 5:
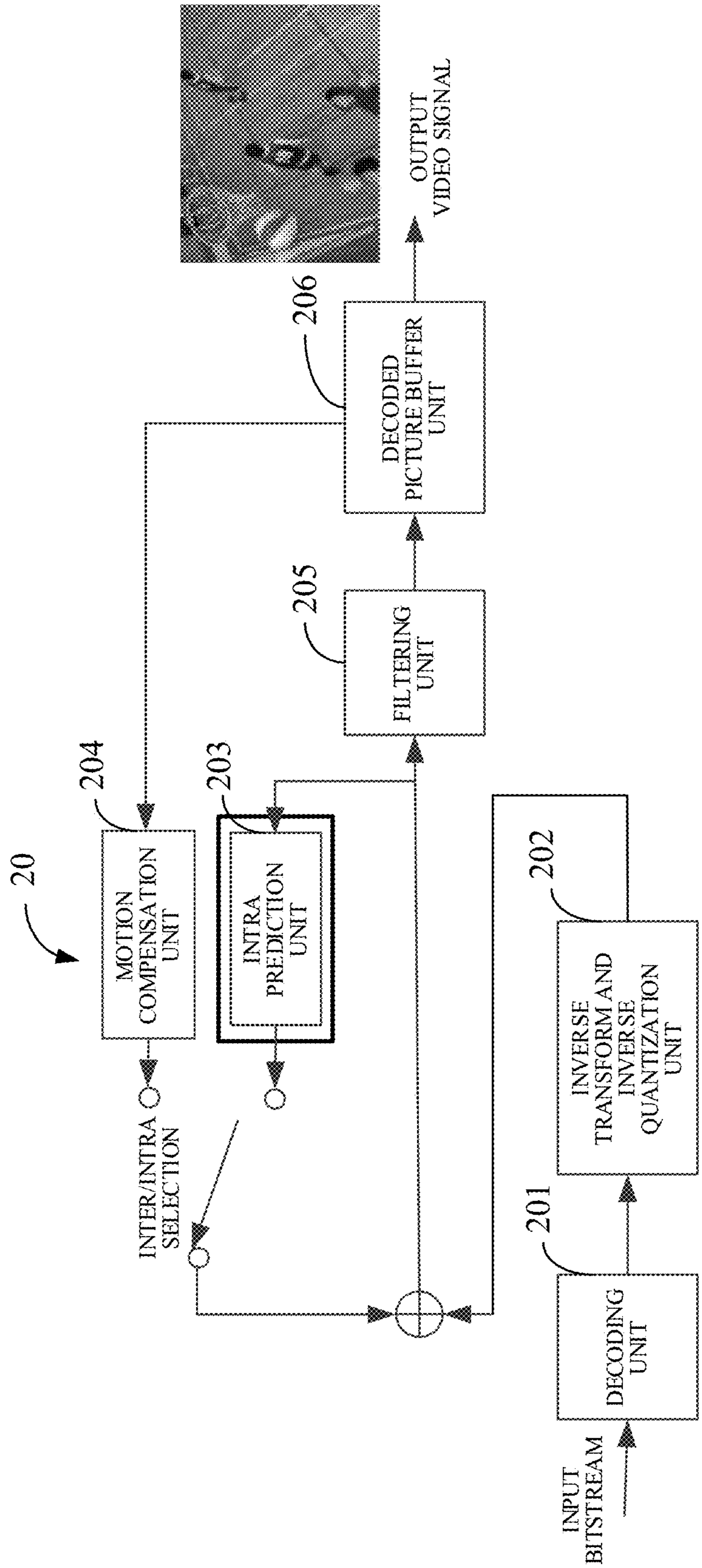
FIG. 5 is a block diagram of components of a video decoding system.

FIG. 5 illustrates a schematic block diagram of a video decoding system provided in implementations of the present disclosure. As illustrated in FIG. 5, the video decoding system 20 includes a decoding unit 201, an inverse transform and inverse quantization unit 202, an intra prediction unit 203, a motion compensation unit 204, a filtering unit 205, a decoded picture buffer unit 206, etc. The decoding unit 201 may implement header information decoding and CABAC decoding, and the filtering unit 205 may implement deblocking filtering and SAO filtering. The input video signal is encoded as illustrated in FIG. 4 and output as a bitstream. The bitstream is then input to the video decoding system 20 and first passes through the decoding unit 201 to obtain the decoded transform coefficients. The inverse transform and inverse quantization unit 202 processes these transform coefficients to generate residual blocks in the pixel domain. The intra prediction unit 203 may produce prediction data for the current video decoding block based on the determined intra prediction mode and data of previously decoded blocks from the current picture. The motion compensation unit 204 determines the prediction information for the video decoding block by parsing motion vectors and other related syntax elements, and uses this information to generate the prediction block for the video decoding block. The decoded video block is formed by summing the residual block from the inverse transform and inverse quantization unit 202 and the corresponding prediction block generated by the intra prediction unit 203 or motion compensation unit 204. The decoded video signal is then passed through the filtering unit 205 to remove blocking artifacts and thus improve video quality. The decoded video block is then stored in the decoded picture buffer unit 206, which stores reference pictures for subsequent intra prediction or motion compensation and is further configured to output the video signal, that is, the recovered original video signal is obtained.

The intra prediction method disclosed in the present disclosure is mainly applied in the intra prediction unit 103 as illustrated in FIG. 4 and the intra prediction unit 203 as illustrated in FIG. 5. In other words, the intra prediction method in the present disclosure may be applied to the video encoding system, to the video decoding system, or even simultaneously to both video encoding system and video decoding system, which is not limited in the disclosure. It should also be noted that when the intra prediction method is applied to the intra prediction unit 103, the "current block" specifically refers to the current encoding block during intra prediction, while when the intra prediction method is applied to the intra prediction unit 203, the "current block" specifically refers to the current decoding block during intra prediction.

The following is a clear and complete description of the technical solution in the implementations of the present disclosure, in conjunction with the accompanying drawings in this disclosure.

Figure 6:
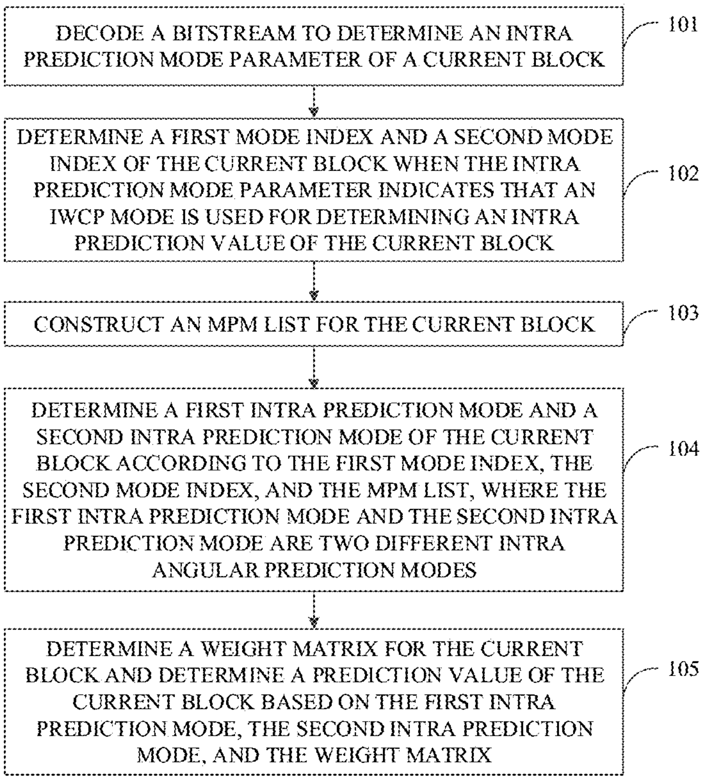
FIG. 6 is a first schematic implementation flowchart of an intra prediction method.

An intra prediction method is provided in implementations of the disclosure, which is applied to a decoder. FIG. 6 is a first schematic implementation flowchart of the intra prediction method. As illustrated in FIG. 6, the intra prediction method performed by the decoder may include the following operations.

At block 101, an intra prediction mode parameter of a current block is determined by decoding a bitstream.

In the implementations of the present disclosure, the decoder may decode the bitstream to determine the intra prediction mode parameter of the current block.

It should be noted that in the implementations of the disclosure, the intra prediction mode parameter may indicate whether an intra weighted combined prediction (IWCP) mode can be used for the current block, i.e., whether two different intra angular prediction modes can be used for the current block to determine a prediction value of the current block.

It may be understood that in the implementations of the present disclosure, the intra prediction mode parameter may be understood as a flag indicating whether the IWCP mode is used or not. Specifically, by decoding the bitstream, the decoder may determine a variable as the intra prediction mode parameter, so that the intra prediction mode parameter may be determined by the value of the variable.

It should be noted that in the implementations of the disclosure, the IWCP mode is an intra prediction method. Specifically, in the IWCP mode, two different intra angular prediction modes are determined for the current block. Then two prediction blocks are determined according to the two different intra angular prediction modes respectively, and a weight matrix may be determined. The two prediction blocks are then combined according to the weight matrix to obtain a new prediction block. As such, the prediction block of the current block is obtained.

Figure 7:
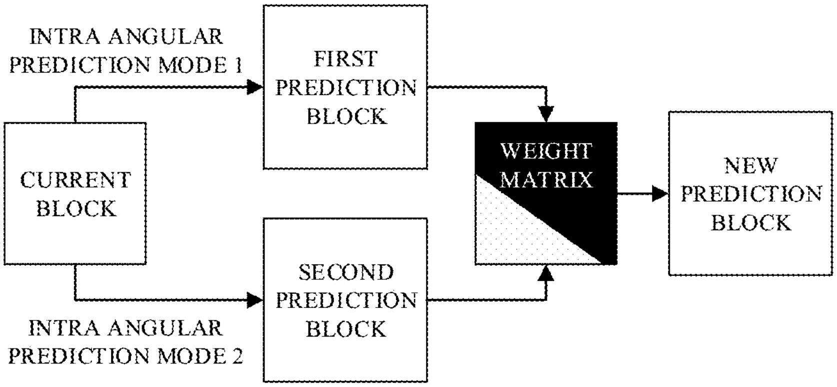
FIG. 7 is a schematic diagram of an IWCP mode.

FIG. 7 is a schematic diagram illustrating the IWCP mode. As illustrated in FIG. 7, when performing intra prediction on the current block, an intra angular prediction mode 1 (the first intra prediction mode) may be used to determine the first prediction block of the current block, while an intra angular prediction mode 2 (the second intra prediction mode) may be used to determine the second prediction block of the current block. Then, the first and second prediction blocks may be combined using the weight matrix to obtain a new prediction block.

It should be noted that in the implementations of the present disclosure, a video picture may be partitioned into multiple picture blocks, and the current block refers to each picture block to-be-encoded currently, which may be referred to as a CB. Here, each coding block may include a first colour component, a second colour component, and a third colour component. Specifically, in this disclosure, if the first intra prediction is performed, and the first colour component is a luma component, i.e., the colour component to-be-predicted is the luma component, the coding block to-be-predicted may be referred to as a luma block. Or, if the second intra prediction is performed, and the second colour component is the chroma component, i.e., the colour component to-be-predicted is a chroma component, the coding block to-be-predicted may be referred to as a chroma block.

Further, in implementations of this disclosure, limitations may be imposed on a block size of the current block when applying the IWCP mode.

It may be understood that, since the intra prediction method proposed in this disclosure requires the use of two different intra angular prediction modes to generate two prediction blocks, which are then weighted according to the weight matrix to obtain a new prediction block, in order to reduce complexity while considering the trade-off between compression performance and complexity, the IWCP mode may not be used for prediction blocks with certain sizes in the implementations of the disclosure. Thus, in this disclosure, the decoder may first determine a size parameter of the current block, and then determine whether to use the IWCP mode for the current block based on the size parameter.

It should be noted that in the implementations of the disclosure, the size parameter of the current block may include both a height and a width of the current block, so the decoder may limit the use of the IWCP mode based on the height and width of the current block, that is, limit the size of the prediction block for which the IWCP mode can be used.

Exemplarily, in this disclosure, if the width and height are both greater than or equal to a first lower limit, and at the same time, the width and height are both less than or equal to a first upper limit, then it may be determined that the IWCP mode is used for the current block. It can be seen that a possible limitation is to use the IWCP mode only when the width and height of the prediction block are both less than (or less than or equal to) the first upper limit and the width and height of the prediction block are both greater than (or greater than or equal to) the first lower limit. The first lower limit may be 8, and the first upper limit may be 16, 32, or the like.

Exemplarily, in this disclosure, there may be a frame-level flag to determine whether the IWCP mode is used for a current frame to-be-decoded. For example, it may be configured that the IWCP mode is used for an intra frame (such as I frame) and is not used for an inter frame (such as B frame and P frame). Optionally, it may be configured that the IWCP mode is not used for the intra frame and is used for the inter frame. Optionally, it may be configured that the IWCP mode is used for some inter frames and is not used for other inter frames. For the inter frame, intra prediction may also be used, so it is also possible to use the IWCP mode for the inter frame.

Exemplarily, in this disclosure, there may be a flag below the frame level and above the CU level (such as tile, slice, patch, LCU, etc.) to determine whether the IWCP mode is used for the area.

At block 102, when the intra prediction mode parameter indicates that the IWCP mode is used for the current block to determine an intra prediction value of the current block, a first mode index and a second mode index of the current block are determined.

In the implementation of the present disclosure, after the decoder determines the intra prediction mode parameter of the current block, if the intra prediction mode parameter indicates that the IWCP mode is used for the current block to determine the intra prediction value of the current block, the decoder may further determine the first mode index and the second mode index of the current block.

It can be understood that, in the implementations of the present disclosure, the first mode index is used to indicate a first intra prediction mode used for the current block, and the second mode index is used to indicate a second intra prediction mode used for the current block.

Specifically, the first mode index and the second mode index each have a value related to the number of possible intra angular prediction modes for the first intra prediction mode and the second intra prediction mode. For example, each of the first intra prediction mode and the second intra prediction mode may be one of 28 intra angular prediction modes with mode numbers from 4 to 31, and then both the value of the first mode index and the value of the second mode index may be in a range of 0-27.

Exemplarily, in the implementations of the present disclosure, a parameter iwcp_pred_mode0_index may be used to represent the first mode index, and a parameter iwcp_pred_mode1_index may be used to represent the second mode index.

At block 103, a most probable mode (MPM) list for the current block is constructed.

In the implementations of the present disclosure, the decoder may also construct the MPM list for the current block. Prediction modes in the MPM list are each an intra angular prediction mode.

Further, in the implementations of the present disclosure, when constructing the MPM list for the current block, the decoder needs to first determine a weight matrix derivation mode of the current block, and then use the weight matrix derivation mode to further determine the MPM list for the current block.

It should be noted that, in this disclosure, the weight matrix derivation mode is used to determine a weight matrix used for the current block. Specifically, the weight matrix derivation mode may be a mode for deriving a weight matrix. For a prediction block with a given width and height, a weight matrix may be derived from each weight matrix derivation mode. For prediction blocks of the same size, weight matrices derived from different weight matrix derivation modes are different.

Exemplarily, in this disclosure, the AWP in AVS3 has 56 weight matrix derivation modes, and the GPM in VVC has 64 weight matrix derivation modes.

Optionally, in this disclosure, when constructing the MPM list for the current block, the decoder may directly construct the MPM list based on a prediction mode of a neighbouring block of the current block and the weight matrix derivation mode.

Optionally, in this disclosure, when constructing the MPM list for the current block, the decoder may also construct the MPM list based on the prediction mode of the neighbouring block of the current block, a preset angular prediction mode set, and the weight matrix derivation mode. The preset angular prediction mode set may be a subset of all intra angular prediction modes. Taking AVS3 as an example, the preset angular prediction mode set may only include 28 intra angular prediction modes with mode numbers from 4 to 31.

It can be understood that, in the present disclosure, if the range of the first intra prediction mode and the range of the second intra prediction mode are not limited, then the preset angular prediction mode set may be a combination of all intra angular prediction modes. If it is necessary to limit the ranges of the first intra prediction mode and the second intra prediction mode, then the preset angular prediction mode set may be only a combination of some intra angular prediction modes, and in this case the preset angular prediction mode set will be used to limit the ranges of the first intra prediction mode and the second intra prediction mode, which can effectively reduce overhead and improve compression performance.

Optionally, in the present disclosure, when constructing the MPM list based on the intra prediction mode of the neighbouring block of the current block, the preset angular prediction mode set, and the weight matrix derivation mode, the decoder may determine a first candidate mode according to the prediction mode of the neighbouring block, determine a second candidate mode according to the weight matrix derivation mode, and further construct the MPM list for the current block according to the first candidate mode, the second candidate mode, and the preset angular prediction mode set.

Specifically, in this disclosure, to determine the first candidate mode according to the prediction mode of the neighbouring block, if the neighbouring block is a normal intra prediction block and the prediction mode of the neighbouring block is an intra prediction mode, then the prediction mode of the neighbouring block is determined as the first candidate mode.

It can be understood that, in this disclosure, a normal intra prediction block means a prediction block for which a prediction mode such as DC mode, Planar mode, Bilinear mode, angular prediction mode, or the like, instead of a prediction mode such as intra block copy (IBC), intra string copy prediction, or the like, is used.

Figure 8:
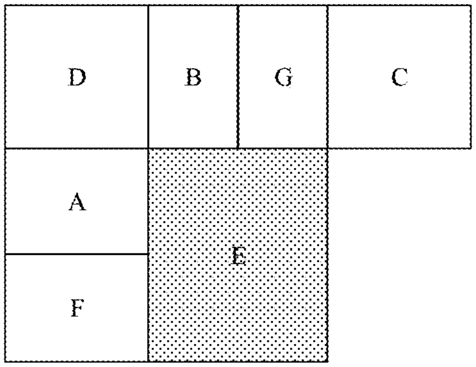
FIG. 8 is a schematic diagram of neighbouring blocks.

FIG. 8 is a schematic diagram of neighbouring blocks. As illustrated in FIG. 8, the current block is E, where (x0, y0) is a coordinate of an upper left corner sample of block E in a picture, (x1, y0) is a coordinate of an upper right corner sample of block E in the picture, and (x0, y1) a coordinate of an lower left corner sample of block E in the picture. Neighbouring block A of current block E is a block where sample (x0−1, y0) is located, neighbouring block B of current block E is a block where sample (x0, y0−1) is located, neighbouring block C of current block E is a block where sample (x1+1, y0−1) is located, neighbouring block D of current block E is a block where sample (x0−1, y0−1) is located, neighbouring block F of block E is a block where sample (x0−1, y1) is located, and neighbouring block G of block E is a block where sample (x1, y0−1) is located. The spatial position relationship between current block E and neighbouring blocks A, B, C and D is illustrated in FIG. 8.

It can be understood that, in this disclosure, the decoder may also use neighbouring blocks more to the right and below of the current block.

Specifically, in the present disclosure, when using the weight matrix derivation mode to determine the second candidate mode, the decoder may first determine a boundary line angle index according to the weight matrix derivation mode, and then use the boundary line angle index to determine the second candidate mode.

It should be noted that, in the implementations of the present disclosure, the second candidate mode may be determined as L different intra angular prediction modes, so that construction of the MPM list with a length L can be guaranteed.

Further, in implementations of the disclosure, in the case that the weight matrix has two values of weights, the positions where the weight values change form a straight light, or in the case that the weight matrix has multiple values of weights, the positions where the weight values are the same in the blending area form a straight line. This straight line may be called the boundary line. The angle horizontal to the right may be set to 0 degree, and angles increase counterclockwise. In this case, the boundary line may have different angles, such as 0 degrees for horizontal, 90 degrees for vertical, inclined angles like 45 degrees, 135 degrees, and others. If a certain weight matrix is selected for a prediction block, the corresponding texture is likely to show different characteristics on two sides of the boundary line, such as textures with two different angles on two sides of the boundary line, or an angular texture on one side of the boundary line, while a flat texture on the other side of the boundary line. Since the boundary line itself also has an angle, it may be assumed that the boundary line is obtained through intra angular prediction with a point, which may be close to some textures of the current block, and then there is correlation between this straight line and the two intra prediction modes for the current block.

Specifically, in this disclosure, assuming that the boundary line is obtained through intra angular prediction with a point, at least one intra angular prediction mode may be found, which may be used to approximately create the boundary line. For example, a horizontal boundary line matches a horizontal intra prediction mode, such as mode 24 in AVS3. A vertical boundary line matches a vertical intra prediction mode, such as mode 12 in AVS3. A 45-degree boundary line may match a 45-degree intra prediction mode from bottom-left to upper-right, such as mode 30 in AVS3, or a 225-degree intra prediction mode from upper-right to bottom-left, such as mode 6 in AVS3. If the weight matrix has only one value of weights, the weight matrix may match a mode without an obvious angle, such as DC mode, Planar mode, Bilinear mode, etc. Thus, the weight matrix derivation mode may match some intra prediction modes, and the weight matrix derivation mode may be used to assist in decoding of the intra prediction modes.

It should be noted that in this disclosure, the weight matrix derivation mode may also be the index of the weight matrix, for example, the 56 modes of AWP may be considered as 56 weight matrix derivation modes.

By way of example, in this disclosure, a mapping table may be constructed to further represent the mapping relationship between weight matrix derivation modes and intra angular prediction modes. Specifically, the boundary lines for multiple modes of AWP and GPM are at the same angle, for example, for AWP of AVS3, the boundary lines for every 8 modes are at the same angle. There are eight angles of the boundary lines for 56 AWP modes. The index of the boundary line angle may be obtained by taking the mode number of the weight matrix derivation mode modulo 8 (%8). For example, Table 1 is a mapping table taking angular modes in AVS3 as an example. The indices 0 and 1 of boundary line angles correspond to two intra angular prediction modes respectively: one from upper right to bottom left and one from upper left to bottom right. In a specific implementation, an approximately corresponding intra angular prediction mode may be found for another boundary line angle index, or all indices of boundary line angle correspond to one intra angular prediction mode.

TABLE 1

| | 5 7 | | | | | | | |
|---|---|---|---|---|---|---|---|---|
| | boundary line angle index | | | | | | | |
| | 0 | 1 | 2 | 3 | 4 | 5 | 5 | 7 |
| corresponding intra angular prediction mode | 6 30 | 27 3 | 24 | 21 | 18 | 15 | 12 | 9 |

For a weight matrix, in addition to the high possibility of using the intra angular prediction mode corresponding to the boundary line, there is also a high possibility of using some intra angular prediction modes related to the boundary line, such as an intra angular prediction mode corresponding to an angle close to the boundary line or an angle perpendicular to the boundary line. The decoder may use the correlation between the weight matrices and the intra angular prediction modes to construct the MPM list of the IWCP mode. For example, when constructing the MPM list of the IWCP mode, if a list length of the MPM list is 4, then candidate modes corresponding to the boundary line angle indexes in Table 2 below may be added to the MPM list.

TABLE 2

| | boundary line angle index | | | | | | | |
|---|---|---|---|---|---|---|---|---|
| | 0 | 1 | 2 | 3 | 4 | 5 | 6 | 7 |
| candidate mode 0 | 30 | 27 | 24 | 21 | 18 | 15 | 12 | 9 |
| candidate mode 1 | 6 | 24 | 12 | 24 | 17 | 14 | 24 | 12 |
| candidate mode 2 | 24 | 6 | 23 | 18 | 19 | 16 | 11 | 8 |
| candidate mode 3 | 12 | 9 | 25 | 12 | 24 | 12 | 13 | 10 |

It is to be understood that, based on Table 2 above, the number of candidate modes corresponding to each boundary line angle index is equal to the length of the MPM list, which can ensure that the MPM list can be filled even if none of intra prediction modes of the neighbouring blocks for reference is available. For example, if the length of the MPM list is 4, the number of candidate modes corresponding to each boundary line angle index may be set to 4.

Further, in the present disclosure, when constructing the MPM list based on the first candidate mode, the second candidate mode, and the preset angular prediction mode set, the decoder may also filter the first candidate mode(s) based on the preset angular prediction mode set to obtain a filtered candidate mode, and construct the MPM list based on the filtered candidate mode and the second candidate mode.

Specifically, in the present disclosure, when filtering the first candidate mode based on the preset angular prediction mode set to obtain the filtered candidate mode, if the first candidate mode belongs to the preset angular prediction mode set, then the decoder determines the first candidate mode as the filtered candidate mode, and if the first candidate mode is an intra angular prediction mode and does not belong to the preset angular prediction mode set, then the decoder determines a substitute mode of the first candidate mode from the preset angular prediction mode set and determines the substitute mode as the filtered candidate mode.

Further, in the present disclosure, if the first candidate mode is not an intra angular prediction mode, then the decoder may directly cancel the first candidate mode.

It is to be understood that in the present disclosure, since the preset angular prediction mode set to which the first intra prediction mode and the second intra prediction mode belong is a subset of all the intra angular prediction modes and does not include an intra non-angular prediction mode, the selection of the MPMs of the current block, i.e., the method of constructing the MPM list, needs to be adjusted accordingly with respect to the IWCP mode. Specifically, the decoder needs to consider the intra prediction mode of the neighbouring block surrounding the current block when constructing the MPM list. For example, the neighbouring blocks is a left neighbouring block, a top neighbouring block, a top left neighbouring block, a top right neighbouring block, a bottom left neighbouring block, and so on. Due to spatial correlation, if a certain prediction mode is used for a neighbouring block, there will be a higher probability of using the same or similar prediction mode for the current block.

Optionally, since both the first intra prediction mode and the second intra prediction mode of the IWCP mode can only be intra angular prediction modes, when the intra prediction mode used for the reference neighbouring block is an intra non-angular prediction mode, i.e., the first candidate mode is a mode that is not an intra angular prediction mode, the decoder does not use the intra non-angular prediction mode used for the reference block in constructing the MPM list for the current block, i.e., does not add that intra non-angular prediction mode to the MPM list for the current block.

Optionally, since the preset angular prediction mode set to which the first intra prediction mode and the second intra prediction mode belong is a subset of all intra angular prediction modes, when the intra prediction mode used for the reference neighbouring block is an intra angular prediction mode not included in the preset angular prediction mode set, i.e., the first candidate mode is an intra angular prediction mode and does not belong to the preset angular prediction mode set, then when constructing the MPM list for the current block, the decoder may convert the intra angular prediction mode not included in the preset angular prediction mode set into an intra angular prediction mode of a similar angle within the preset angular prediction mode set, and then add to the MPM list. Taking AVS3 as an example, if the preset angular prediction mode set limits the first intra prediction mode and the second intra prediction mode to only intra angular prediction modes numbered from 4 to 31, and an intra angular prediction mode numbered 43 is used for a neighbouring block of the current block, then the decoder may add the intra angular prediction numbered 12, which corresponding to an angle similar to the intra angular prediction numbered 43, to the MPM list for the current block in the IWCP mode.

Further, in an implementation of the present disclosure, to construct the MPM list based on the filtered candidate mode and the second candidate mode, if the filtered candidate mode satisfies a preset addition condition, the filtered candidate mode is added to the MPM list. If the MPM list does not reach a preset list length L, and the second candidate mode satisfies the preset addition condition, the second candidate mode is added to the MPM list. L is an integer greater than or equal to 1.

Exemplarily, in the present disclosure, the value of L may be 4, i.e., the preset list length of the MPM list is 4, or the MPM list includes 4 MPMs.

It will be appreciated that in implementations of the present disclosure, the decoder may sort the L modes in the MPM list in an ascending order of mode number.

It is to be noted that in implementations of the present disclosure, if the filtered candidate mode is different from any prediction mode in the MPM list, then the decoder may determine that the filtered candidate modes satisfies the preset addition condition. Accordingly, if the second candidate mode is different from any prediction mode in the MPM list, then the decoder may determine that the second candidate mode satisfies the preset addition condition.

It is to be understood that, in implementations of the present disclosure, the decoder may determine order parameters corresponding to neighbouring blocks when adding the filtered candidate modes corresponding to the neighbouring blocks to the MPM list. In accordance with the order parameters, the filtered intra candidate modes corresponding to the neighbouring blocks are sequentially added to the MPM list. The decoder may determine the corresponding order parameters in accordance with the spatial distance between the neighbouring blocks and the current block. For example, the closer the spatial distance between the neighbouring block and the current block, the stronger the correlation between the neighbouring block and the current block, and the earlier the addition process, that is, the smaller the order parameter. The farther the spatial distance between the neighbouring block and the current block, the weaker the correlation, and the later the addition process, that is, the larger the order parameter.

Further, in implementations of the present disclosure, after adding the filtered candidate mode and/or the second candidate mode to the MPM list, the decoder may also sort the L prediction modes in the MPM list in an ascending order of mode numbers.

Exemplarily, in the present disclosure, assume that the MPM list for the current block in the IWCP mode is IwcpMpm[4], i.e., the list length of the MPM list is 4, the index of the weight matrix derivation mode is IwcpIndex, the weight matrix derivation mode reuses the 56 derivation modes of the AWP, and the preset angular prediction mode set to which the first intra prediction mode and the second intra prediction mode belong includes intra angular prediction modes numbered from 4 to 31. Then the decoder may perform the following steps in sequence when constructing the MPM list for the current block:

In step S1: set an array cand_mode[10] and initialise all values of cand_mode to invalid values. For cand_mode, perform the following operations:

(a) If neighbouring block F is "present" and is a normal intra prediction block, cand_mode[0] is equal to an intra prediction mode of F;

(b) If neighbouring block G is "present" and is a normal intra prediction block, cand_mode[1] is equal to an intra prediction mode of G;

(c) If neighbouring block C is "present" and is a normal intra prediction block, cand_mode[2] is equal to an intra prediction mode of C;

(d) If neighbouring block A "present" and is a normal intra prediction block, cand_mode[3] is equal to an intra prediction mode of A;

(e) If neighbouring block B is "present" and is a normal intra prediction block, cand_mode[4] is equal to an intra prediction mode of B;

(f) If neighbouring block D is "present" and is a normal intra prediction block, cand_mode[5] is equal to an intra prediction mode of D;

(g) cand_mode[6] is equal to candidate mode 0 corresponding to IwcpIndex %8;

(h) cand_mode[7] is equal to candidate mode 1 corresponding to IwcpIndex %8;

(i) cand_mode[8] is equal to candidate mode 2 corresponding to IwcpIndex %8; and (j) cand_mode[9] is equal to candidate mode 3 corresponding to IwcpIndex %8.

In the above, neighbouring block X (X is A, B, C, D, F or G) being "present" means that this block should be in the picture and that the block should belong to the same slice as block E; otherwise the neighbouring block is "absent". If the block is "absent" or has not been decoded, the block is "unavailable"; otherwise the block is "available". If the block in which a sample of the picture is located is "absent" or the sample has not been decoded, the sample is "unavailable"; otherwise, the sample is "available".

It is to be understood that in the present disclosure, the steps from (a) to (f) above form a determination process for the first candidate mode, and the steps from (g) to (j) above form a determination process for the second candidate mode, where the decoder may determine the second candidate mode with reference to Table 2 above.

In step S2: for i from 0 to 5, perform the following operations:

(a) If cand_mode[i] is less than 3 or cand_mode[i] is equal to 33, cand_mode[i] is set to an invalid value.

That is, if the first candidate mode is an intra non-angular prediction mode, then the decoder may cancel the first candidate mode, i.e., not use the first candidate mode.

(b) Otherwise, if cand_mode[i] is equal to 3, cand_mode[i] is set equal to 4.

(c) Otherwise, if cand_mode[i] is equal to 32, cand_mode[i] is set equal to 31.

(d) Otherwise, if cand_mode[i] is greater than 33, perform the following:

If cand_mode[i] is less than 44, cand_mode[i] is set equal to cand_mode[i]-30;

Otherwise, if cand_mode[i] is less than 58, cand_mode[i] is set equal to cand_mode[i]-33; and Otherwise, cand_mode[i] is set equal to cand_mode[i]-34.

That is, if the first candidate mode is an intra angular prediction mode, but the first candidate mode does not belong to the preset angular prediction mode set, then the decoder may select a similar intra angular prediction mode from the preset angular prediction mode set as a substitute mode for the first candidate mode, and then use the substitute mode as the filtered candidate mode.

(e) Otherwise, the value of cand_mode[i] is not modified.

That is, if the first candidate mode belongs to the preset angular prediction mode set, then the decoder may directly use the first candidate mode, i.e., the first candidate mode is the filtered candidate mode.

It is to be understood that in the present disclosure, the above step S2 is the filtering process for the first candidate mode, and the filtered candidate mode corresponding to the first candidate mode is finally determined.

In step S3: set mpm_num to 0. For i from 0 to 9, perform the following:

(a) If cand_mode[i] is not an invalid value, perform the following:
  compare cand_mode[i] with IwcpMpm[j], where j is from 0 to mpm_num−1, and if cand_mode[i] is different from any IwcpMpm[j], perform the following:
    1. set IwcpMpm[mpm_num] equal to cand_mode[i];
    2. set mpm_num equal to mpm_num+1; and
    3. if mpm_num is equal to 4, end step 3.

That is to say, in a case that there are less than 4 prediction modes in the MPM list, if the filtered candidate mode is not the same as any of the prediction modes in the MPM list, then the decoder may add the filtered candidate mode to the MPM list. If there are still less than 4 prediction modes in the MPM list after all the filtered candidate modes satisfying the preset addition condition have been added to the MPM list, then the decoder may continue to add the second candidate mode satisfying the preset addition condition to the MPM list, until the list length of the MPM list reaches 4.

In step S4, the four values of IwcpMpm[4] are sorted in an ascending order.

Finally, the decoder may sort the four intra angular prediction modes in the MPM list in ascending order of mode number.

It is to be understood that the present disclosure does not limit the execution order of the above blocks 102 and 103, i.e., the sequence between the process of determining the first mode index and the second mode index and the process of constructing the MPM list is not limited in the present disclosure.

At block 104, a first intra prediction mode and a second intra prediction mode of the current block are determined according to the first mode index, the second mode index, and the MPM list, where the first intra prediction mode and the second intra prediction mode are two different intra angular prediction modes.

In implementations of the present disclosure, after determining the first mode index and the second mode index of the current block and constructing the MPM list for the current block, the decoder may further determine the first intra prediction mode and the second intra prediction mode of the current block according to the first mode index, the second mode index, and the MPM list.

It is to be understood that in implementations of the present disclosure, the first intra prediction mode and the second intra prediction mode may be two different intra angular prediction modes. Specifically, in implementations of the present disclosure, the first intra prediction mode and the second intra prediction mode may be two different intra angular prediction modes in the preset angular prediction mode set.

That is, in the present disclosure, both the first intra prediction mode and the second intra prediction mode can only be intra angular prediction modes, i.e., neither the first intra prediction mode nor the second intra prediction mode is a basic intra prediction mode other than an intra angular prediction mode, such as an intra non-angular prediction mode including DC mode, Planar mode, PLANE mode, Bilinear mode, PCM mode, and the like. The basic intra prediction modes include, but are not limited to, angular prediction modes and non-angular prediction modes. For example, there are 67 intra prediction modes used in VVC and 66 intra prediction modes used in AVS3.

It is to be understood that in the present disclosure, by restricting the first intra prediction mode and the second intra prediction mode to the intra angular prediction modes, on the one hand, the complexity of the hardware implementation of the IWCP mode can be reduced, because only one additional set of circuits that supports the intra angular weighted prediction needs to be added to the hardware when implementing the IWCP mode in a parallel manner. On the other hand, the IWCP mode per se is applicable to a block with relatively complex contents while the intra non-angular prediction modes are usually used to handle scenes with relatively uniform texture changes, and the overhead can be reduced due to use of fewer modes, and thus whether to use the intra non-angular prediction modes in the IWCP mode has almost no effect on the compression performance.

Further, in the present disclosure, although using more intra angular prediction modes can generate the prediction value with higher accuracy, the overhead of transmitting flags for the selected modes in the bitstream will be increased accordingly. Therefore, in order to obtain a better compression performance, a reasonable set of available intra prediction modes may be selected to achieve a better trade-off between prediction effect and overhead. Specifically, the decoder may limit the available intra angular prediction modes for the first intra prediction mode and the second intra prediction mode by using the preset angular prediction mode set, where the preset angular prediction mode set is a subset of all intra angular prediction modes. As an example, AVS3 has 62 angular modes, i.e., intra angular prediction modes with mode numbers from 3 to 32 and from 34 to 65.

Exemplarily, in the present disclosure, the first intra prediction mode and the second intra prediction mode may use only the intra angular prediction modes with mode numbers from 3 to 32, or, the first intra prediction mode and the second intra prediction mode may use only the 28 intra angular prediction modes with mode numbers from 4 to 31.

Exemplarily, in the present disclosure, in the case of VVC, the first intra prediction mode and the second intra prediction mode may use only the intra angular prediction modes with even mode numbers, or, the first intra prediction mode and the second intra prediction mode may use only the intra angular prediction modes with odd mode numbers.

Exemplarily, in the present disclosure, the angular prediction mode set used for the first intra prediction mode and the angular prediction mode set used for the second intra prediction mode are not the same. Optionally, the decoder may limit the first intra prediction mode and the second intra prediction mode by using the same preset angular prediction mode set. That is, if the first intra prediction mode may only use the 28 intra angular prediction modes with the mode numbers from 4 to 31, the second intra prediction mode may also use only the 28 intra angular prediction modes with the mode numbers from 4 to 31, and thus the first intra prediction mode and the second intra prediction mode may use the same MPM list and use the same or similar coding method. In other words, if the decoder limits the first intra prediction mode and the second intra prediction mode by using different preset angular prediction mode sets, then different MPM lists or significantly different coding methods are required for the first intra prediction mode and the second intra prediction mode.

Further, in implementations of the present disclosure, the decoder may determine a first mapping table between index values and binary strings. The first mapping table includes a binary string of a first length, a binary string of a second length, and a binary string of a third length respectively.

Exemplarily, in the present disclosure, the first length is 3 bits, the second length is 5 bits, and the third length is 6 bits.

It is noted that in the present disclosure, the first mapping table between index values and binary strings may be used to determine the values of the first mode index and the second mode index.

Optionally, in the present disclosure, for AVS3, if 28 intra angular prediction modes with mode numbers from 4 to 31 are used, i.e., a total of 28 modes are included in the preset angular prediction mode set, then the modes may be encoded in a manner of 4+8+16, i.e., 4 modes with the shortest codewords, 8 modes with the shorter codewords, and 16 modes with the longer codewords. In this case, the 4 modes with the shortest codewords are encoded using 3-bit codewords, i.e., using the first length, the 8 modes with the shorter codewords are encoded using 5-bit codewords, i.e., using the second length, and the 16 modes with the longer codewords are encoded using 6-bit codewords, i.e., using the third length.

It should be noted that in the present disclosure, the prediction angles of the 28 intra angular prediction modes with mode numbers from 4 to 31 essentially cover the entire range of commonly used angles. Additionally, the intra angular prediction modes with mode numbers from 4 to 31 are simpler than the intra angular prediction modes with mode numbers from 34 to 65. Further, encoding these 28 modes in the manner of 4+8+16 will not result in a waste of codewords. Therefore, the decoder may preferably define the preset angular prediction mode set in accordance with the 28 intra angular prediction modes with mode numbers from 4 to 31.

Further, in implementations of the present disclosure, if the list length of the MPM list for the current block is 4, then the 4 MPMs in the MPM list may be encoded using the binary strings of the first length, i.e., the 4 modes with the shortest codewords may be assigned to the 4 MPMs in the MPM list. Accordingly, other prediction modes in the preset angular prediction mode set and not included in in the MPM list may be encoded using the binary strings of the second length and the binary strings of the third length.

Optionally, in the present disclosure, for the other 24 intra angular prediction modes in the preset angular prediction mode set and other than the 4 MPMs in the MPM list, the decoder may evenly distribute the modes with the shorter codewords and the modes with the longer codewords. Specifically, the decoder may evenly distribute the 8 modes with the shorter codewords (binary strings of the second length) among the remaining 24 intra angular prediction modes. For example, one mode with the shorter codeword (binary string of the second length) is used every two modes with the longer codewords (binary string of the third length). Specifically, the serial numbers from 0 to 23 for the remaining 24 intra angular prediction modes may modulo 3 (%3), e.g., a mode with a serial number that modulo 3 equals to 2 uses a 5-bit codeword, i.e., the binary string of the second length, and a mode with a serial number that modulo 3 equals to 0 or 1 uses a 6-bit codeword, i.e., the binary string of the third length.

Exemplarily, in the present disclosure, if 28 intra angular prediction modes with mode numbers from 4 to 31 are used, i.e., a total of 28 modes are included in the preset angular prediction mode set, then the first mapping table between the index values and the binary strings may be as illustrated in Table 3, where the first length is 3 bits, the second length is 5 bits, and the third length is 6 bits.

TABLE 3

| index value | binary string | | | | | |
|---|---|---|---|---|---|---|
| 0 | 1 | 0 | 0 | | | |
| 1 | 1 | 0 | 1 | | | |
| 2 | 1 | 1 | 0 | | | |
| 3 | 1 | 1 | 1 | | | |
| 4 | 0 | 0 | 0 | 0 | 0 | 0 |
| 5 | 0 | 0 | 0 | 0 | 0 | 1 |
| 6 | 0 | 1 | 0 | 0 | 0 | |
| 7 | 0 | 0 | 0 | 0 | 1 | 0 |
| 8 | 0 | 0 | 0 | 0 | 1 | 1 |
| 9 | 0 | 1 | 0 | 0 | 1 | |
| 10 | 0 | 0 | 0 | 1 | 0 | 0 |
| 11 | 0 | 0 | 0 | 1 | 0 | 1 |
| 12 | 0 | 1 | 0 | 1 | 0 | |
| 13 | 0 | 0 | 0 | 1 | 1 | 0 |
| 14 | 0 | 0 | 0 | 1 | 1 | 1 |
| 15 | 0 | 1 | 0 | 1 | 1 | |
| 16 | 0 | 0 | 1 | 0 | 0 | 0 |
| 17 | 0 | 0 | 1 | 0 | 0 | 1 |
| 18 | 0 | 1 | 1 | 0 | 0 | |
| 19 | 0 | 0 | 1 | 0 | 1 | 0 |
| 20 | 0 | 0 | 1 | 0 | 1 | 1 |
| 21 | 0 | 1 | 1 | 0 | 1 | |
| 22 | 0 | 0 | 1 | 1 | 0 | 0 |
| 23 | 0 | 0 | 1 | 1 | 0 | 1 |
| 24 | 0 | 1 | 1 | 1 | 0 | |
| 25 | 0 | 0 | 1 | 1 | 1 | 0 |
| 26 | 0 | 0 | 1 | 1 | 1 | 1 |
| 27 | 0 | 1 | 1 | 1 | 1 | |
| binIdx | 0 | 1 | 2 | 3 | 4 | 5 |

In this case, the first bit may be used to indicate whether it is an MPM. For example, "1" represents an MPM, and "0" represents a non-MPM. If the first intra prediction mode is an MPM, and assuming that there are 4 MPMs in the MPM list, then 2 bits may be used to indicate which MPM in the MPM list is used. For example, "00, 01, 10, 11" represent the first MPM, the second MPM, the third MPM, and the fourth MPM in the MPM list, respectively.

Further, in the present disclosure, a binary string with a bit flag of 0 is decoded using a context model, and a binary string with a bit flag other than 0 is decoded without the context model. The value of the bit flag may indicate how many bits have been decoded, and the bit flag may be represented by binIdx.

It should be noted that in the present disclosure, at the decoding side, when performing inverse binarization according to Table 3, binary strings with binIdx of 0 may be decoded using a context model, while binary strings with binIdx other than 0 are decoded using an equal probability model or a bypass mode.

Further, in the present disclosure, when determining the first intra prediction mode and the second intra prediction mode of the current block according to the first mode index, the second mode index, and the MPM list, the decoder may first determine a value i of the first mode index according to the first mapping table between index values and binary strings, where i is an integer greater than or equal to 0. If i is greater than or equal to 0 and less than L, the angular prediction mode with an index i in the MPM list is determined as the first intra prediction mode. If i is greater than or equal to L, the first intra prediction mode is determined according to the preset angular prediction mode set and the MPM list.

Specifically, in the present disclosure, when determining the first intra prediction mode according to the preset angular prediction mode set and the MPM list, the decoder sums i and 1 if i is greater than or equal to a mode number of the first mode in the MPM list, sums (i+1) and 1 if (i+1) is greater than or equal to a mode number of the second mode in the MPM list, sums (i+2) and 1 if (i+2) is greater than or equal to a mode number of the third mode in the MPM list, and sums (i+3) and 1 if (i+3) is greater than or equal to a mode number of the fourth mode in the MPM list. The decoder then determines (i+4) as a mode number of the first intra prediction mode and determine the first intra prediction mode from the preset angular prediction mode set.

Accordingly, in the present disclosure, when determining the first intra prediction mode according to the preset angular prediction mode set and the MPM list, if i is less than the mode number of the first mode in the MPM list, the decoder determines i as the mode number of the first intra prediction mode and determines the first intra prediction mode from the preset angular prediction mode set. Optionally, if (i+1) is less than the mode number of the second mode in the MPM list, the decoder determines (i+1) as the mode number of the first intra prediction mode and determines the first intra prediction mode from the preset angular prediction mode set. Optionally, if (i+2) is less than the mode number of the third mode in the MPM list, the decoder determines (i+2) as the mode number of the first intra prediction mode and determines the first intra prediction mode from the preset angular prediction mode set. Optionally, if (i+3) is less than the mode number of the fourth mode in the MPM list, the decoder determines (i+3) as the mode number of the first intra prediction mode and determines the first intra prediction mode from the preset angular prediction mode set.

Exemplarily, in the present disclosure, if the mode numbers of the 4 MPMs in the MPM list are 4, 8, 12, and 16, and the value i of the first mode index determined based on the first mapping table between index values and binary strings, as illustrated in Table 3 above, is 5, then, in the preset angular prediction mode set including the 28 intra angular prediction modes with mode numbers from 4 to 31, i is compared with the mode numbers of the 4 MPMs in the MPM list sequentially. Specifically, since 5 is greater than the mode number of the first mode in the MPM list, the decoder may determine to sum i and 1, i.e., i+1=6. Then the decoder compares 6 with the mode number of the second mode in the MPM list. Since 6 is less than 8, the decoder determines the value 6 of (i+1) as the mode number of the first intra prediction mode, and determine an intra angular prediction mode with a mode number of 6 in the preset angular prediction mode set as the first intra prediction mode.

Exemplarily, in the present disclosure, if the mode numbers of the 4 MPMs in the MPM list are 4, 8, 12, and 16, and the value i of the first mode index determined based on the first mapping table between index values and binary strings, as illustrated in Table 3 above, is 10, then, in the preset angular prediction mode set including the 28 intra angular prediction modes with mode numbers from 4 to 31, i is compared with the mode numbers of the 4 MPMs in the MPM list sequentially. Specifically, since 10 is greater than the mode number of the first mode in the MPM list, the decoder may determine to sum i and 1, i.e., i+1=11. Then the decoder compares 11 with the mode number of the second mode in the MPM list. Since 11 is greater than 8, the decoder may determine to sum (i+1) and 1, i.e., (i+1)+1=12. Then the decoder compares 12 with the mode number of the third mode in the MPM list. Since 12 is equal to 12, the decoder may determine to sum (i+2) and 1, i.e., (i+2)+1=13. Then the decoder compares 13 with the mode number of the fourth mode in the MPM list. Since 13 is less than 16, the decoder may determine the value 13 of (i+3) as the mode number of the first intra prediction mode, and determine an intra angular prediction mode with a mode number of 13 in the preset angular prediction mode set as the first intra prediction mode.

Further, in the present disclosure, when determining the first intra prediction mode and the second intra prediction mode of the current block according to the first mode index, the second mode index, and the MPM list, the decoder may first determine a value j of the second mode index according to the first mapping table, where j is an integer greater than or equal to 0. If j is greater than or equal to 0 and less than L, the (j+1)-th angular prediction mode in the MPM list is determined as the second intra prediction mode. If j is greater than or equal to L, the second intra prediction mode is determined according to the preset angular prediction mode set and the MPM list.

Specifically, in the present disclosure, when determining the second intra prediction mode according to the preset angular prediction mode set and the MPM list, the decoder sums j and 1 if j is greater than or equal to a mode number of the first mode in the MPM list, sums (j+1) and 1 if (j+1) is greater than or equal to a mode number of the second mode in the MPM list, sums (j+2) and 1 if (j+2) is greater than or equal to a mode number of the third mode in the MPM list, and sums (j+3) and 1 if j+3) is greater than or equal to a mode number of the fourth mode in the MPM list. The decoder then determines j+4) as a mode number of the second intra prediction mode and determine the second intra prediction mode from the preset angular prediction mode set.

Accordingly, in the present disclosure, when determining the second intra prediction mode according to the preset angular prediction mode set and the MPM list, if j is less than the mode number of the first mode in the MPM list, the decoder determines j as the mode number of the second intra prediction mode and determines the second intra prediction mode from the preset angular prediction mode set. Optionally, if (j+1) is less than the mode number of the second mode in the MPM list, the decoder determines j+1) as the mode number of the second intra prediction mode and determines the second intra prediction mode from the preset angular prediction mode set. Optionally, if (j+2) is less than the mode number of the third mode in the MPM list, the decoder determines j+2) as the mode number of the second intra prediction mode and determines the second intra prediction mode from the preset angular prediction mode set. Optionally, if j+3) is less than the mode number of the fourth mode in the MPM list, the decoder determines j+3) as the mode number of the second intra prediction mode and determines the second intra prediction mode from the preset angular prediction mode set.

Exemplarily, in the present disclosure, if the IWCP mode is used for the current block, the length of the MPM list for the current block is 4, i.e., L=4, and the preset angular prediction mode set includes 28 intra angular prediction modes with mode numbers from 4 to 31, then the decoder may determine the first mode index iwcp_pred_mode0_index and the second mode index iwcp_pred_mode1_index by decoding the bitstream, and then derive the first intra prediction mode as IwcpPredMode0 and the second intra prediction mode as IwcpPredMode1 according to the first mode index iwcp_pred_mode0_index and the second mode index iwcp_pred_mode1_index.

When determining the first intra prediction mode IwcpPredMode0 according to the first mode index iwcp_pred_mode0_index, the decoder may specifically perform the following operations:

1. Determine the value of iwcp_pred_mode0_index to be i by inverse binarization of the binary string according to Table 3.

Specifically, after determining iwcp_pred_mode0_index in the form of binary string based on decoding, inverse binarization may be performed on the binary string in accordance with Table 3, i.e., a binary string matched with iwcp_pred_mode0_index is found from the right column of Table 3, and then a value i of iwcp_pred_mode0_index is determined from the left column of the same row.

2. If i is greater than or equal to 0 and less than 4, IwcpPredMode0 is equal to IwcpMpm[i].
3. If i is greater than or equal to 4, IwcpPredMode0 is equal to (iwcp_pred_mode0_index+(iwcp_pred_mode0_index>=IwcpMpm[0])+((iwcp_pred_mode0_index+1)>=IwcpMpm[1])+((iwcp_pred_mode0_index+2)>=IwcpMpm[2])+((iwcp_pred_mode0_index+3)>=IwcpMpm[3])).

That is, in the present disclosure, if the first intra prediction mode IwcpPredMode0 does not belong to the MPM list, but is one of the 24 intra angular prediction modes in the preset angular prediction mode set and other than MPMs in the MPM list, then the decoder may compare the value i of the first mode index iwcp_pred_mode0_index with a mode number of each angular prediction mode in the MPM list sequentially and determine whether to sum with 1 based on the comparison result. Finally the decoder calculates the mode number of the first intra prediction mode and determine the first intra prediction mode from the preset angular prediction mode set according to the mode number.

When determining the second intra prediction mode IwcpPredMode1 according to the second mode index iwcp_pred_mode1_index, the decoder may specifically perform the following operations:

1. Determine the value of iwcp_pred_mode1_index to be j by inverse binarization of the binary string according to Table 3.

Specifically, after determining iwcp_pred_mode1_index in the form of binary string based on decoding, the binary string may be determined by inverse binarization in accordance with Table 3. That is, a binary string matched with iwcp_pred_mode1_index is found from the right column of Table 3, and then the value j of iwcp_pred_mode1_index is determined from the left column of the same row.

2. If j is greater than or equal to 0 and less than 4, IwcpPredMode1 is equal to IwcpMpm[i].
3. If j is greater than or equal to 4, then IwcpPredMode1 is equal to (iwcp_pred_mode1_index+(iwcp_pred_mode1_index>=IwcpMpm[0])+((iwcp_pred_mode1_index+1)>=IwcpMpm[1])+((iwcp_pred_mode1_index+2)>=IwcpMpm[2])+((iwcp_pred_mode1_index+3)>=IwcpMpm[3]))).

Further, in implementations of the present disclosure, since the first intra prediction mode and the second intra prediction mode are required in the IWCP mode for determining the prediction value of the current block, the first intra prediction mode and the second intra prediction mode may share one preset angular prediction mode set, and may also share the same MPM list. However, the first intra prediction mode and the second intra prediction mode are not the same in the IWCP mode. Therefore, the second intra prediction mode may be coded with reference to the first intra prediction mode. Specifically, the first intra prediction mode may be excluded when determining the second intra prediction mode.

It is to be understood that in the present disclosure, for the 28 intra angular prediction modes, the probability of the 4 MPMs in the MPM list is high (the probability of the first intra prediction mode being one of the 4 MPMs in the MPM list is about 50%, and the probability of the second intra prediction mode being one of the 4 MPMs in the MPM list is about 50%) in the above coding manner of 4+8+16. If both the first intra prediction mode and the second intra prediction mode are MPMs in the MPM list, then when determining the second intra prediction mode, it is only necessary to choose one of the other 3 MPMs in the MPM list other than the first intra prediction mode. Thus, the original four choices requiring four 3-bit codewords may be reduced to three choices requiring one 2-bit codeword and two 3-bit codewords. Correspondingly, if neither the first intra prediction mode nor the second intra prediction mode is an MPM in the MPM list, then for the second intra prediction mode, one mode may also be removed from the 24 intra angular prediction modes of 8+16, although this has less impact.

As can be seen, for the case where both the first intra prediction mode and the second intra prediction mode are MPMs in the MPM list, it is possible to exclude the first intra prediction mode in advance when determining the second intra prediction mode, which allows for a reduction in overhead.

Further, in implementations of the present disclosure, if the first intra prediction mode is an MPM in the MPM list, i.e., the decoder determines that the value i of the first mode index is greater than or equal to 0 and less than L, then after determining the (i+1)-th angular prediction mode of the MPM list as the first intra prediction mode, when determining the second intra prediction mode, the decoder may determine a value j of the second mode index according to a second mapping table between index values and binary strings. If j is greater than or equal to i, then j is incremented by 1. After incremented by 1, if j is greater than or equal to 0 and less than L, then the (j+1)-th angular prediction mode in the MPM list is determined as the second intra prediction mode. If j is greater than or equal to L, then the second intra prediction mode is determined according to the preset angular prediction mode set and the MPM list.

Further, in implementations of the present disclosure, the decoder may determine the second mapping table between index values and binary strings, where the second mapping table includes a binary string of a first length, a binary string of a second length, a binary string of a third length, and a binary string of a fourth length.

Exemplarily, in the present disclosure, the first length is 3 bits, the second length is 5 bits, the third length is 6 bits, and the fourth length is 2 bits.

It is noted that in the present disclosure, the second mapping table between index values and binary strings is only used to determine the value of the second mode index.

Optionally, in the present disclosure, the second mapping table between index values and binary strings may be illustrated in Table 4, where the first length is 3 bits, the second length is 5 bits, the third length is 6 bits, and the fourth length is 2 bits.

TABLE 4

| index value | binary string | | | | | |
|---|---|---|---|---|---|---|
| 0 | 1 | 0 | | | | |
| 1 | 1 | 1 | 0 | | | |
| 2 | 1 | 1 | 1 | | | |
| 3 | 0 | 0 | 0 | 0 | 0 | 0 |
| 4 | 0 | 0 | 0 | 0 | 0 | 1 |
| 5 | 0 | 1 | 0 | 0 | 0 | |
| 6 | 0 | 0 | 0 | 0 | 1 | 0 |
| 7 | 0 | 0 | 0 | 0 | 1 | 1 |
| 8 | 0 | 1 | 0 | 0 | 1 | |
| 9 | 0 | 0 | 0 | 1 | 0 | 0 |
| 10 | 0 | 0 | 0 | 1 | 0 | 1 |
| 11 | 0 | 1 | 1 | 0 | 1 | |
| 12 | 0 | 0 | 0 | 1 | 1 | 0 |
| 13 | 0 | 0 | 0 | 1 | 1 | 1 |
| 14 | 0 | 1 | 0 | 1 | 1 | |
| 15 | 0 | 0 | 1 | 0 | 0 | 0 |
| 16 | 0 | 0 | 1 | 0 | 0 | 1 |
| 17 | 0 | 1 | 1 | 0 | 0 | |
| 18 | 0 | 0 | 1 | 0 | 1 | 0 |
| 19 | 0 | 0 | 1 | 0 | 1 | 1 |
| 20 | 0 | 1 | 1 | 0 | 1 | |
| 21 | 0 | 0 | 1 | 1 | 0 | 0 |
| 22 | 0 | 0 | 1 | 1 | 0 | 1 |
| 23 | 0 | 1 | 1 | 1 | | |
| 24 | 0 | 0 | 1 | 1 | 1 | 0 |
| 25 | 0 | 0 | 1 | 1 | 1 | 1 |
| 26 | 0 | 1 | 1 | 1 | 1 | |
| binIdx | 0 | 1 | 2 | 3 | 4 | 5 |

The length of the MPM list is 4, and the preset angular prediction mode set includes 28 intra angular prediction modes with mode numbers from 4 to 31. The decoder may determine the first mode index iwcp_pred_mode0_index and the second mode index iwcp_pred_mode1_index by decoding the bitstream, and then derive the first intra prediction mode as IwcpPredMode0 and derive the second intra prediction mode as IwcpPredMode1 according to the first mode index iwcp_pred_mode0_index and the second mode index iwcp_pred_mode1_index.

It should be noted that in the present disclosure, at the decoding side, when performing inverse binarization according to Table 4, a binary string with a binIdx of 0 may be decoded using a context model, while a binary string with a binIdx other than 0 may be decoded using an equal probability model or a bypass mode.

When determining the first intra prediction mode IwcpPredMode0 according to the first mode index iwcp_pred_mode0_index, the decoder may specifically perform the following operations:

1. Determine the value of iwcp_pred_mode0_index to be i by inverse binarization of the binary string according to Table 3.
2. If i is greater than or equal to 0 and less than 4, then IwcpPredMode0 is equal to IwcpMpm[i].
3. If i is greater than or equal to 4, then IwcpPredMode0 is equal to (iwcp_pred_mode0_index+(iwcp_pred_mode0_index>=IwcpMpm[0])+((iwcp_pred_mode0_index+1)>=IwcpMpm[1])+((iwcp_pred_mode0_index+2)>=IwcpMpm[2])+((iwcp_pred_mode0_index+3)>=IwcpMpm[3])).

When determining the second intra prediction mode IwcpPredMode1 according to the second mode index iwcp_pred_mode1_index, the decoder may specifically perform the following operations:

1. If i is greater than or equal to 0 and less than 4, perform the following operations:
   (a) perform inverse binarization of the binary string according to Table 4 to determine the value of iwcp_pred_mode1_index to be j; and
   (b) if iwcp_pred_mode1_index is greater than or equal to iwcp_pred_mode0_index, i.e., j is greater than or equal to i, then iwcp_pred_mode1_index is equal to iwcp_pred_mode1_index+1, i.e., sum 1 and j, i.e., j=j+1, and then perform Step 3.
2. If i is greater than or equal to 4, then perform inverse binarization on the binary string according to Table 3, and determine the value of iwcp_pred_mode1_index to be j, and then perform step 3.
3. If j is greater than or equal to 0 and less than 4, then IwcpPredMode1 is equal to IwcpMpm[i].
4. If j is greater than or equal to 4, then IwcpPredMode1 is equal to (iwcp_pred_mode1_index+(iwcp_pred_mode1_index>=IwcpMpm[0])+((iwcp_pred_mode1_index+1)>=IwcpMpm[1])+((iwcp_pred_mode1_index+2)>=IwcpMpm[2])+((iwcp_pred_mode1_index+3)>=IwcpMpm[3]))).

It can be seen that if the determination of the second intra prediction mode is based on the first intra prediction mode, then the value j of iwcp_pred_mode1_index is dependent on the value i of iwcp_pred_mode0_index. Specifically, taking Table 4 as an example, if the first intra prediction mode and the second intra prediction mode are both MPMs in the MPM list, then there are only three MPMs available for the second intra prediction mode. Therefore, the MPM may be indicated by one or two bits, e.g., "00, 01, 10" indicating the remaining first, second, and third MPM, respectively. It can be seen that, as one possibility is excluded, the coding method or binarization or inverse binarization method can be changed to save overhead.

It is to be noted that, in implementations of the present disclosure, if the preset angular prediction mode set includes 28 intra angular prediction modes with mode numbers from 4 to 31 and the length of the MPM list is 4, then when determining the first mapping table between index values and binary strings according to binary strings of the first length, the second length, and the third length, the binary strings of the first length, i.e., the shortest codewords, may be used for the 4 MPMs in the MPM list. Then, the binary strings of the second length may be used for 8 intra angular prediction modes selected from the remaining 24 intra angular prediction modes, and the binary strings of the third length may be used for 16 intra angular prediction modes selected from the remaining 24 intra angular prediction modes.

Specifically, in the present disclosure, for the remaining 24 intra angular prediction modes, according to an ascending order of the mode numbers, shorter codewords, i.e., binary strings of the second length, may be used for the prediction modes corresponding to the first 8 modes, and then longer codewords, i.e., binary strings of the third length, may be used for the prediction modes corresponding to the subsequent 16 modes.

Exemplarily, in the present disclosure, the first mapping table between index values and binary strings illustrated in Table 3 above may be replaced with Table 5 below, where Table 5 that represents the first mapping relationships between the index values and the binary strings may also be used to determine the value of the first mode index and the value of the second mode index.

TABLE 5

| index value | binary string | | |
|---|---|---|---|
| 0 | 1 | 0 | 0 |
| 1 | 1 | 0 | 1 |

TABLE 5-continued

| index value | binary string | | | | | |
|---|---|---|---|---|---|---|
| 2 | 1 | 1 | 0 | | | |
| 3 | 1 | 1 | 1 | | | |
| 4 | 0 | 0 | 0 | 0 | 0 | |
| 5 | 0 | 0 | 0 | 0 | 1 | |
| 6 | 0 | 0 | 0 | 1 | 0 | |
| 7 | 0 | 0 | 0 | 1 | 1 | |
| 8 | 0 | 0 | 1 | 0 | 0 | |
| 9 | 0 | 0 | 1 | 0 | 1 | |
| 10 | 0 | 0 | 1 | 1 | 0 | |
| 11 | 0 | 0 | 1 | 1 | 1 | |
| 12 | 0 | 1 | 0 | 0 | 0 | 0 |
| 13 | 0 | 1 | 0 | 0 | 0 | 1 |
| 14 | 0 | 1 | 0 | 0 | 1 | 0 |
| 15 | 0 | 1 | 0 | 0 | 1 | 1 |
| 16 | 0 | 1 | 0 | 1 | 0 | 0 |
| 17 | 0 | 1 | 0 | 1 | 0 | 1 |
| 18 | 0 | 1 | 0 | 1 | 1 | 0 |
| 19 | 0 | 1 | 0 | 1 | 1 | 1 |
| 20 | 0 | 1 | 1 | 0 | 0 | 0 |
| 21 | 0 | 1 | 1 | 0 | 0 | 1 |
| 22 | 0 | 1 | 1 | 0 | 1 | 0 |
| 23 | 0 | 1 | 1 | 0 | 1 | 1 |
| 24 | 0 | 1 | 1 | 1 | 0 | 0 |
| 25 | 0 | 1 | 1 | 1 | 0 | 1 |
| 26 | 0 | 1 | 1 | 1 | 1 | 0 |
| 27 | 0 | 1 | 1 | 1 | 1 | 1 |
| binIdx | 0 | 1 | 2 | 3 | 4 | 5 |

Accordingly, it is also possible to replace Table 4, which is the second mapping table between the index values and the binary strings above, with the following Table 6, where Table 6 illustrating the second mapping relationships between the index values and the binary strings may also be used for determining the value of the second mode index.

TABLE 6

| index value | binary string | | | | | |
|---|---|---|---|---|---|---|
| 0 | 1 | 0 | | | | |
| 1 | 1 | 1 | 0 | | | |
| 2 | 1 | 1 | 1 | | | |
| 3 | 0 | 0 | 0 | 0 | 0 | |
| 4 | 0 | 0 | 0 | 0 | 1 | |
| 5 | 0 | 0 | 0 | 1 | 0 | |
| 6 | 0 | 0 | 0 | 1 | 1 | |
| 7 | 0 | 0 | 1 | 0 | 0 | |
| 8 | 0 | 0 | 1 | 0 | 1 | |
| 9 | 0 | 0 | 1 | 1 | 0 | |
| 10 | 0 | 0 | 1 | 1 | 1 | |
| 11 | 0 | 1 | 0 | 0 | 0 | 0 |
| 12 | 0 | 1 | 0 | 0 | 0 | 1 |
| 13 | 0 | 1 | 0 | 0 | 1 | 0 |
| 14 | 0 | 1 | 0 | 0 | 1 | 1 |
| 15 | 0 | 1 | 0 | 1 | 0 | 0 |
| 16 | 0 | 1 | 0 | 1 | 0 | 1 |
| 17 | 0 | 1 | 0 | 1 | 1 | 0 |
| 18 | 0 | 1 | 0 | 1 | 1 | 1 |
| 19 | 0 | 1 | 1 | 0 | 0 | 0 |
| 20 | 0 | 1 | 1 | 0 | 0 | 1 |
| 21 | 0 | 1 | 1 | 0 | 1 | 0 |
| 22 | 0 | 1 | 1 | 0 | 1 | 1 |
| 23 | 0 | 1 | 1 | 1 | 0 | 0 |
| 24 | 0 | 1 | 1 | 1 | 0 | 1 |
| 25 | 0 | 1 | 1 | 1 | 1 | 0 |
| 26 | 0 | 1 | 1 | 1 | 1 | 1 |
| binIdx | 0 | 1 | 2 | 3 | 4 | 5 |

It will be appreciated that in the present disclosure, if 28 intra angular prediction modes with mode numbers from 4 to 31 are used, i.e., the preset angular prediction mode set includes 28 modes, then the coding manner of 4+8+16 may be used, that is, 4 modes with 3 bits, 8 modes with 5 bits, and 16 modes with 6 bits.

Optionally, in the present disclosure, if a total of 20 modes are included in the preset angular prediction mode set, the modes may be represented using four 3-bit codewords and sixteen 5-bit codewords.

Optionally, in the present disclosure, if a total of 36 modes are included in the preset angular prediction mode set, the modes may be represented using four 3-bit codewords and thirty-two 6-bit codewords. For example, in AVS3, 36 intra angular prediction modes with mode numbers from 4 to 31, 42-45, and 56-59 may be used.

It should be noted that, in the present disclosure, if all the modes in the preset angular prediction mode set are represented by the set of binary strings as illustrated in Table 3 or Table 4, then a "codeword" may be understood as a binary string. The length of the codeword may be understood as the length of the binary string. Another representation is a combination of a binary string and a flag. For example, a binary MPM_flag is used to indicate whether the current mode is an MPM mode or not, i.e., if MPM_flag is 1, it means that the current mode is an MPM mode, and if MPM_flag is 0, it means that the current mode is not an MPM mode. If the current mode is an MPM mode, there are 4 possibilities for MPM, and then a binary string of 2 bits is used to indicate the current mode being which of the MPMs. In this case, the codeword may be understood as the combination of the flag and the binary string, and the length of the codeword may be understood as the length of the combination of the flag and the binary string.

At block 105, a weight matrix is determined for the current block, and a prediction value of the current block is determined according to the first intra prediction mode, the second intra prediction mode, and the weight matrix.

In implementations of the present disclosure, the decoder needs to determine the weight matrix for the current block, so that after determining the first intra prediction mode and the second intra prediction mode used for the current block, the decoder further determines the prediction value for the current block according to the first intra prediction mode, the second intra prediction mode, and the weight matrix.

Specifically, in the present disclosure, the decoder may determine the weight matrix for the current block according to a weight matrix derivation mode of the current block.

Further, in the present disclosure, when determining the prediction value of the current block according to the first intra prediction mode, the second intra prediction mode, and the weighting matrix, the decoder may first determine a first prediction value of the current block according to the first intra prediction mode, determine a second prediction value of the current block according to the second intra prediction mode, and then weight the first prediction value and the second prediction value using the weight matrix to obtain the prediction value of the current block.

It is to be understood that in the present disclosure, both the first intra prediction mode and the second intra prediction mode may be intra angular prediction modes, i.e., two different intra angular prediction modes are used in the present disclosure. The first intra prediction mode and the second intra prediction mode are then used to generate a first prediction block and a second prediction block, respectively. Further, the prediction block of the current block is determined based on the first prediction block and the second prediction block in combination with the weight matrix.

Further, in implementations of the present disclosure, not all points in each of possible weight matrices have the same weight values. In other words, at least one of the possible weight matrices contains at least two different weight values.

It should be noted that in implementations of the disclosure, the decoder may determine the weight matrix using a method similar to GPM or AWP. Specifically, in the same coding standard or codec, if GPM or AWP is used, then such method may also be used to determine the weight matrix, so that some common logics may be reused. For instance, AWP is used in inter prediction in AVS3, so it is possible to use AWP for determining the weight matrix in AVS3. Additionally, other methods different from GPM or AWP could also be used in the same coding standard or codec, for example, using different numbers of modes, different algorithms for blending areas, different parameters, etc. Inter prediction utilizes temporal correlation, where a reconstructed block in the reference picture is used as the reference block. Intra prediction utilizes spatial correlation, where reconstructed samples around the current block are used as reference samples. The closer the distance in space, the stronger the correlation, while the farther the distance, the weaker the correlation. Therefore, if a certain weight matrix makes that a prediction value is obtained using sample positions that are far from reference sample(s), then such weight matrix may not be able to produce more suitable prediction values than existing technology, and thus such weight matrix may not be used. Instead, the weight matrix may be used in inter prediction.

The implementations of the present disclosure provide the intra prediction method in which the codec can determine two different prediction blocks of the current block using two different intra angular prediction modes, and then combine the two different prediction blocks using various weight matrices to obtain a more complex prediction block. In this way, while improving the accuracy of intra prediction, the cost of hardware implementation can be reduced, and a simple and efficient coding method can be achieved, thus improving the compression performance.

Based on the above implementations, in a further implementation of the present disclosure, the following prediction sample matrix is the prediction block described above, i.e., "block" may be understood as "sample matrix", and the reference to an "array" herein means a matrix. The IWCP may be used for the prediction of a luma component as an example. However, the present disclosure is not limited to the luma component, but may also be used for a chroma component and any other components in any other format. As an example, the intra prediction method proposed in this disclosure is applied in AVS3. The specific process for the decoder to determine the prediction value of the current block using the IWCP mode may be described as follows.

It should be noted that in a specific decoding implementation, since AWP technology is used in AVS3, the weight matrix of the IWCP mode reuses the weight matrix of AWP, i.e., the weight matrix of IWCP is derived in the same manner as the weight matrix of AWP.

Exemplarily, a sequence-level flag may be used to determine whether the IWCP mode is used for a current sequence to-be-decoded.

For example, the sequence header definition in Table 7.

TABLE 7

| Sequence Header Definition | descriptors |
|---|---|
| sequence__header( ) { | |
| ...... | |
| iwcp__enable__flag | u(1) |
| ...... | |

In the above, the enable flag for the IWCP mode, iwcp_enable_flag, is a binary variable. Specifically, a value of "1" for iwcp_enable_flag indicates that the IWCP mode can be used, and a value of "0" indicates that the IWCP mode cannot be used. iwcpEnableFlag has a value equal to iwcp_enable_flag. If iwcp_enable_flag is absent in the bitstream, then IwcpEnableFlag has a value of 0.

Exemplarily, a frame-level flag may be used to determine whether the IWCP mode is used for a current frame to-be-decoded. For example, it may be configured that the IWCP mode is used for an intra frame (such as I frame) and is not used for an inter frame (such as B frame and P frame). Optionally, it may be configured that the IWCP mode is not used for the intra frame and is used for the inter frame. Optionally, it may be configured that the IWCP mode is used for some inter frames and is not used for other inter frames.

Exemplarily, a flag below the frame level and above the CU level (such as tile, slice, patch, LCU, etc.) may be used to determine whether the IWCP mode is used for the area.

Exemplarily, when the decoder decodes a current CU, if the current CU meets the condition for using IWCP, the decoder decodes the IWCP enable flag for the current CU. Otherwise, there is no need to decode the IWCP enable flag for the current CU. The condition for using IWCP may be that: the current CU is an intra coded CU (IntraCuFlag below is 1), IWCP can be used for the current sequence (IwcpEnableFlag below is 1), and the size of the current block is within the limitation (width>=IwcpMinSize&& height>=IwcpMinSize &&width<=IwcpMaxSize&& height<=IwcpMaxSize below). In a possible case, IwcpMinSize is equal to 8 and IwcpMaxSize is equal to 32. In a possible case, IwcpMinSize is equal to 8 and IwcpMaxSize is equal to 16. "width" represents a width of the current CU and "height" represents a height of the current CU.

Exemplarily, for encoding in the YUV 4:2:0 format, where the 8×8 luma block corresponds to the 4×4 chroma blocks at the same position, one possible approach is to allow use of the IWCP mode for the 8×8 luma block but not for the 4×4 chroma blocks. This is because the improvement in prediction effect of using the IWCP mode for a 4×4 block is not significant, and on the other hand, the cost of hardware implementation will be increased.

Exemplarily, if IWCP is used for the current CU, then some other modes such as derived tree (DT), intra prediction filter (IPF), improved intra prediction (IIP), etc. will not be used for the current block. That is, there is no need to process the information related to these modes if IWCP is used for the current CU. This is because the prediction effect of IWCP in combination with these modes will not be significantly improved. On the contrary, if it is default to not use the DT, IPF, and IP when IWCP is used for the current block, there is no need to transmit in the bitstream flags that indicating use of these modes, such as dt_split_flag, intra_pf_flag, and iip_flag, which can save the codewords and contribute to the compression efficiency.

An example is illustrated in Table 8 below:

TABLE 8

```
......
If(IwcpEnableFlag&& IntraCuFlag&&width>=IwcpMinSize&&
height>=IwcpMinSize &&width<=
IwcpMaxSize&& height<=IwcpMaxSize){
iwcp__flag
}
if (DtEnableFlag && IntraCuFlag&&!IwcpFlag) {
dt__split__flag
......
```

TABLE 8-continued

```
}
......
if (IntraPfEnableFlag && (PartSize == 'SIZE_2Mx2N') && (!
IsPcmMode[0]) && !IwcpFlag) {
intra_pf_flag
}
if (IipEnableFlag && (PartSize == 'SIZE_2Mx2N') &&
(!IsPcmMode[0]) && (!
IntraPfFlag) && (width * height >= 64) && (width <= 64) &&
(height <= 64)
&& !IwcpFlag) {
iip_flag
}
```

The IWCP flag iwcp_flag is a binary variable. A value of "1" for iwcp_flag indicates that the IWCP mode should be used, and a value of "0" indicates that the IWCP mode should not be used. The value of IwcpFlag is equal to the value of iwcp_flag. If iwcp_flag is absent in the bitstream, the value of IwcpFlag is 0.

The DT split flag dt_split_flag is a binary variable. A value of "1" for dt_split_flag indicates that the DT split should be performed, and a value of "0" indicates that the DT split should not be performed. The value of DtSplitFlag is equal to the value of dt_split_flag, in the range from 0 to 4. If dt_split_flag is absent in the bitstream, the value of DtSplitFlag is 0. The DT split indicates that the current CU may be split into rectangle PUs.

The IPF flag intra_pf_flag is a binary variable. A value of "1" for intra_pf_flag indicates that the intra prediction filtering should be used for the current CU, and a value of "0" indicates that the intra prediction filtering should not be used for the current CU. The value of IntraPfFlag is equal to the value of intra_pf_flag. If intra_pf_flag is absent in the bitstream, the value of IntraPfFlag is 0. Intra prediction filtering may be used to generate, after an initial prediction value has been generated, a new prediction value by filtering the initial prediction value using a reference sample.

The IIP flag iip_flag is a binary variable. A value of "1" for iip_flag indicates that the improved intra prediction should be used for the current CU, and a value of "0" indicates that the improved intra prediction should not be used for the current CU. The value of IipFlag is equal to the value of iip_flag. If iip_flag is absent in the bitstream, the value of IipFlag is 0. The improved intra prediction may generate a prediction value using a different filter than that is used where the improved prediction is not used. An example is for some angular prediction, an 8-tap filter is used to generate the prediction value in case of improved intra prediction, and a 4-tap filter is used to generate the prediction value in case of no improved intra prediction.

Exemplarily, if IWCP is used for the current CU, it is necessary to decode the bitstream to determine the weight matrix derivation mode iwcp_idx and the first mode index iwcp_pred_mode0_index and the second mode index iwcp_pred_mode1_index of the two intra prediction modes, as illustrated in Table 9 below. The weight matrix derivation mode is reused with a weight matrix derivation mode of AWP.

TABLE 9

```
......
if ((IwcpFlag) {
iwcp_idx
iwcp_pred_mode0_index
iwcp_pred_mode1_index
```

TABLE 9-continued

```
}
......
```

The IWCP mode index iwcp_idx is used to determine a weight matrix of the IWCP mode, and the value of IwepIndex is equal to the value of iwcp_idx. If iwcp_idx is absent in the bitstream, the value of IwepIndex is equal to 0.

The first mode index iwcp_pred_mode0_index in the IWCP mode is used to determine the first intra prediction mode IwcpPredMode0 of the luma block in the IWCP mode.

The second mode index iwcp_pred_mode1_index in the IWCP mode is used to determine the second intra prediction mode IwcpPredMode1 of the luma block in the IWCP mode.

Further, after determining the first intra prediction mode and the second intra prediction mode, based on the method proposed in block 105 of the above implementation, a first intra luma prediction sample matrix predMatrixY0 may be determined according to IwcpPredMode0, and a second intra luma prediction sample matrix predMatrixY1 may be determined according to IwcpPredMode1. After determining a luma weight matrix IwcpWeightMatrixY according to IwcpIndex, the luma weight matrix IwcpWeightMatrixY is used to weight the first intra luma prediction sample matrix predMatrixY0 and the second intra luma prediction sample matrix predMatrixY1 to finally determined a luma prediction sample matrix predMatrixIwcpY.

Specifically, the luma prediction sample matrix predMatrixIwcpY of the IWCP may be determined according to the two intra luma prediction sample matrices predMatrixY0 and predMatrixY1, and the weight matrix IwcpWeightMatrixY as follows.

A value of element predMatrixIwcpY[x][y] in the prediction sample matrix predMatrixIwcpY of the IWCP mode is ((predMatrixY0[x][y]*IwcpWeightMatrixY[x][y]+predMatrixY1[x][y]*(8−IwcpWeightMatrixY[x][y])+4)>>3), where (x, y) is the coordinate position within the current block.

Further, after determining the prediction block of the IWCP, i.e., the prediction sample matrix predMatrixIwcpY of the IWCP mode, the subsequent processing may further include decoding of the quantization coefficients, inverse transformation and inverse quantization to determine the residual block, and combining the residual block and the prediction block to form a reconstruction block, as well as subsequent loop filtering, and the like.

The implementations of the present disclosure provide the intra prediction method in which the codec can determine two different prediction blocks of the current block using two different intra angular prediction modes, and then combine the two different prediction blocks by various weight matrices to obtain the more complex prediction block. In this way, while improving the accuracy of intra prediction, the cost of hardware implementation can be reduced, and a simple and efficient coding method can be achieved, thus improving the compression performance.

Figure 9:
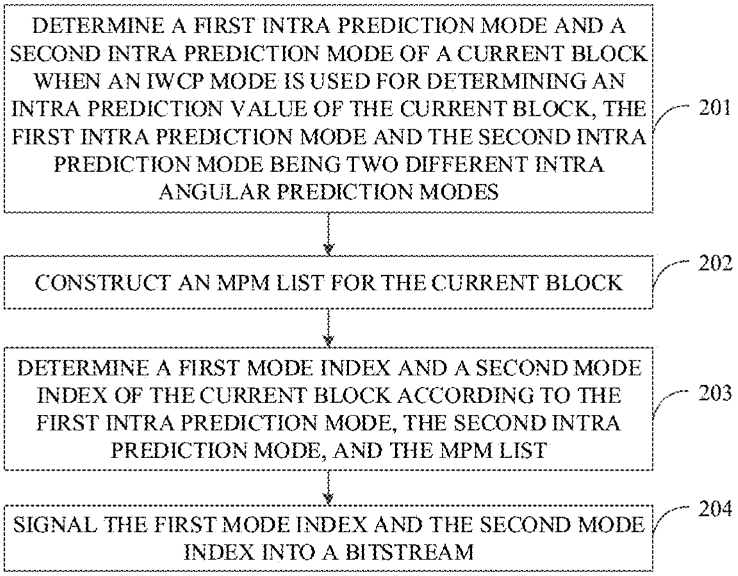
FIG. 9 is a second schematic implementation flowchart of an intra prediction method.

An intra prediction method is provided in implementations of the disclosure, which is applied to an encoder. FIG. 9 is a second schematic implementation flowchart of the intra prediction method. As illustrated in FIG. 9, the intra prediction method performed by the encoder may include the following operations.

At block 201, a first intra prediction mode and a second intra prediction mode of a current block are determined when an IWCP mode is used for the current block to determine an intra prediction value of the current block, where the first intra prediction mode and the second intra prediction mode are two different intra angular prediction modes.

In implementations of the disclosure, if it is determined that the IWCP mode is used for the current block to determine the intra prediction value of the current block, the encoder may first determine the first intra prediction mode and the second intra prediction mode of the current block, where the first intra prediction mode and the second intra prediction mode are two different intra angular prediction modes.

It should be noted that in the implementations of the disclosure, the IWCP mode represents an intra prediction method. Specifically, in the IWCP mode, two different intra angular prediction modes are determined for the current block. Then two prediction blocks are determined according to the two different intra angular prediction modes respectively, and a weight matrix may be determined. The two prediction blocks are then combined according to the weight matrix to obtain a new prediction block. As such, the prediction block of the current block is obtained.

Further, in implementations of this disclosure, limitations may be imposed on a block size of the current block when applying the IWCP mode.

It may be understood that, since the intra prediction method proposed in this disclosure requires the use of two different intra angular prediction modes to generate two prediction blocks, which are then weighted according to the weight matrix to obtain a new prediction block, in order to reduce complexity while considering the trade-off between compression performance and complexity, the IWCP mode may not be used for prediction blocks with certain sizes in the implementations of the disclosure. Thus, in this disclosure, the encoder may first determine a size parameter of the current block, and then determine whether to use the IWCP mode for the current block based on the size parameter.

It should be noted that in the implementations of the disclosure, the size parameter of the current block may include both a height and a width of the current block, so the encoder may limit the use of the IWCP mode based on the height and width of the current block, that is, limit the size of the prediction block for which the IWCP mode can be used.

Exemplarily, in this disclosure, if the width and height are both greater than or equal to a first lower limit, and at the same time, the width and height are both less than or equal to a first upper limit, then it may be determined that the IWCP mode is used for the current block. It can be seen that a possible limitation is to use the IWCP mode only when the width and height of the prediction block are both less than (or less than or equal to) the first upper limit and the width and height of the prediction block are both greater than (or greater than or equal to) the first lower limit. The first lower limit may be 8, and the first upper limit may be 16, 32, or the like.

Exemplarily, for encoding in the YUV 4:2:0 format, where the 8×8 luma block corresponds to the 4×4 chroma blocks at the same position, one possible approach is to allow use of the IWCP mode for the 8×8 luma block but not for the 4×4 chroma blocks. This is because the improvement in prediction effect of using the IWCP mode for a 4×4 block is not significant, and on the other hand, the cost of hardware implementation will be increased.

Exemplarily, in this disclosure, there may be a frame-level flag to determine whether the IWCP mode is used for a current frame to-be-decoded. For example, it may be configured that the IWCP mode is used for an intra frame (such as I frame) and is not used for an inter frame (such as B frame and P frame). Optionally, it may be configured that the IWCP mode is not used for the intra frame and is used for the inter frame. Optionally, it may be configured that the IWCP mode is used for some inter frames and is not used for other inter frames. For the inter frame, intra prediction may also be used, so it is also possible to use the IWCP mode for the inter frame.

Exemplarily, in this disclosure, there may be a flag below the frame level and above the CU level (such as tile, slice, patch, LCU, etc.) to determine whether the IWCP mode is used for the area.

It should be noted that in implementations of the disclosure, the encoder may determine a combination of intra prediction modes and weight matrix derivation mode with a minimum rate-distortion, where the combination includes the first intra prediction mode, the second intra prediction mode, and the weight matrix derivation mode.

Further, in implementations of the present disclosure, the first intra prediction mode and the second intra prediction mode may be two different intra angular prediction modes. Specifically, in implementations of the present disclosure, the first intra prediction mode and the second intra prediction mode may be two different intra angular prediction modes in the preset angular prediction mode set.

That is, in the present disclosure, both the first intra prediction mode and the second intra prediction mode can only be intra angular prediction modes, i.e., neither the first intra prediction mode nor the second intra prediction mode is a basic intra prediction mode other than an intra angular prediction mode, such as an intra non-angular prediction mode including DC mode, Planar mode, PLANE mode, Bilinear mode, PCM mode, and the like. The basic intra prediction modes include, but are not limited to, angular prediction modes and non-angular prediction modes. For example, there are 67 intra prediction modes used in VVC and 66 intra prediction modes used in AVS3.

It is to be understood that in the present disclosure, by restricting the first intra prediction mode and the second intra prediction mode to the intra angular prediction modes, on the one hand, the complexity of the hardware implementation of the IWCP mode can be reduced, because only one additional set of circuits that supports the intra angular weighted prediction needs to be added to the hardware when implementing the IWCP mode in a parallel manner. On the other hand, the IWCP mode per se is applicable to a block with relatively complex contents while the intra non-angular prediction modes are usually used to handle scenes with relatively uniform texture changes, and the overhead can be reduced due to use of fewer modes, and thus whether to use the intra non-angular prediction modes in the IWCP mode has almost no effect on the compression performance.

Further, in the present disclosure, although using more intra angular prediction modes can generate the prediction value with higher accuracy, the overhead of transmitting flags for the selected modes in the bitstream will be increased accordingly. Therefore, in order to obtain a better compression performance, a reasonable set of available intra prediction modes may be selected to achieve a better trade-off between prediction effect and overhead. Specifically, the encoder may limit the available intra angular prediction modes for the first intra prediction mode and the second intra prediction mode by using the preset angular prediction mode set, where the preset angular prediction mode set is a subset of all intra angular prediction modes. As an example, AVS3 has 62 angular modes, i.e., intra angular prediction modes with mode numbers from 3 to 32 and from 34 to 65.

Exemplarily, in the present disclosure, the first intra prediction mode and the second intra prediction mode may use only the intra angular prediction modes with mode numbers from 3 to 32, or, the first intra prediction mode and the second intra prediction mode may use only the 28 intra angular prediction modes with mode numbers from 4 to 31.

Exemplarily, in the present disclosure, in the case of VVC, the first intra prediction mode and the second intra prediction mode may use only the intra angular prediction modes with even mode numbers, or, the first intra prediction mode and the second intra prediction mode may use only the intra angular prediction modes with odd mode numbers.

Exemplarily, in the present disclosure, the angular prediction mode set used for the first intra prediction mode and the angular prediction mode set used for the second intra prediction mode are not the same. Optionally, the decoder may limit the first intra prediction mode and the second intra prediction mode by using the same preset angular prediction mode set. That is, if the first intra prediction mode may only use the 28 intra angular prediction modes with the mode numbers from 4 to 31, the second intra prediction mode may also use only the 28 intra angular prediction modes with the mode numbers from 4 to 31, and thus the first intra prediction mode and the second intra prediction mode may use the same MPM list and use the same or similar coding method. In other words, if the decoder limits the first intra prediction mode and the second intra prediction mode by using different preset angular prediction mode sets, then different MPM lists or significantly different coding methods are required for the first intra prediction mode and the second intra prediction mode.

At block 202, an MPM list for current block is constructed.

In the implementations of the present disclosure, the encoder may also construct the MPM list for the current block. Prediction modes in the MPM list are each an intra angular prediction mode.

Further, in the implementations of the present disclosure, when constructing the MPM list for the current block, the encoder needs to first determine a weight matrix derivation mode of the current block, and then use the weight matrix derivation mode to further determine the MPM list for the current block.

It should be noted that, in this disclosure, the weight matrix derivation mode is used to determine a weight matrix used for the current block. Specifically, the weight matrix derivation mode may be a mode for deriving a weight matrix. For a prediction block with a given width and height, a weight matrix may be derived from each weight matrix derivation mode. For prediction blocks of the same size, weight matrices derived from different weight matrix derivation modes are different.

Exemplarily, in this disclosure, the AWP in AVS3 has 56 weight matrix derivation modes, and the GPM in VVC has 64 weight matrix derivation modes.

Optionally, in this disclosure, when constructing the MPM list for the current block, the encoder may directly construct the MPM list based on a prediction mode of a neighbouring block of the current block and the weight matrix derivation mode.

Optionally, in this disclosure, when constructing the MPM list for the current block, the encoder may also construct the MPM list based on the prediction mode of the neighbouring block of the current block, a preset angular prediction mode set, and the weight matrix derivation mode. The preset angular prediction mode set may be a subset of all intra angular prediction modes. Taking AVS3 as an example, the preset angular prediction mode set may only include 28 intra angular prediction modes with mode numbers from 4 to 31.

It can be understood that, in the present disclosure, if the range of the first intra prediction mode and the range of the second intra prediction mode are not limited, then the preset angular prediction mode set may be a combination of all intra angular prediction modes. If it is necessary to limit the ranges of the first intra prediction mode and the second intra prediction mode, then the preset angular prediction mode set may be only a combination of some intra angular prediction modes, and in this case the preset angular prediction mode set will be used to limit the ranges of the first intra prediction mode and the second intra prediction mode, which can effectively reduce overhead and improve compression performance.

Optionally, in the present disclosure, when constructing the MPM list based on the intra prediction mode of the neighbouring block of the current block, the preset angular prediction mode set, and the weight matrix derivation mode, the encoder may determine a first candidate mode according to the prediction mode of the neighbouring block, determine a second candidate mode according to the weight matrix derivation mode, and further construct the MPM list for the current block according to the first candidate mode, the second candidate mode, and the preset angular prediction mode set.

Specifically, in this disclosure, to determine the first candidate mode according to the prediction mode of the neighbouring block, if the neighbouring block is a normal intra prediction block and the prediction mode of the neighbouring block is an intra prediction mode, then the prediction mode of the neighbouring block is determined as the first candidate mode.

It can be understood that, in this disclosure, a normal intra prediction block means a prediction block for which a prediction mode such as DC mode, Planar mode, Bilinear mode, angular prediction mode, or the like, instead of a prediction mode such as IBC mode, intra string copy prediction, or the like, is used.

Specifically, in the present disclosure, when using the weight matrix derivation mode to determine the second candidate mode, the encoder may first determine a boundary line angle index according to the weight matrix derivation mode, and then use the boundary line angle index to determine the second candidate mode.

It should be noted that, in the implementations of the present disclosure, the second candidate mode may be determined as L different intra angular prediction modes, so that construction of the MPM list with a length L can be guaranteed.

Further, in implementations of the disclosure, in the case that the weight matrix has two values of weights, the positions where the weight values change form a straight light, or in the case that the weight matrix has multiple values of weights, the positions where the weight values are the same in the blending area form a straight line. This straight line may be called the boundary line. The angle horizontal to the right may be set to 0 degree, and angles increase counterclockwise. In this case, the boundary line may have different angles, such as 0 degrees for horizontal, 90 degrees for vertical, inclined angles like 45 degrees, 135 degrees, and others. If a certain weight matrix is selected for a prediction block, the corresponding texture is likely to show different characteristics on two sides of the boundary line, such as textures with two different angles on two sides of the boundary line, or an angular texture on one side of the boundary line, while a flat texture on the other side of the boundary line. Since the boundary line itself also has an angle, it may be assumed that the boundary line is obtained through intra angular prediction with a point, which may be close to some textures of the current block, and then there is correlation between this straight line and the two intra prediction modes for the current block.

Specifically, in this disclosure, assuming that the boundary line is obtained through intra angular prediction with a point, at least one intra angular prediction mode may be found, which may be used to approximately create the boundary line. For example, a horizontal boundary line matches a horizontal intra prediction mode, such as mode 24 in AVS3. A vertical boundary line matches a vertical intra prediction mode, such as mode 12 in AVS3. A 45-degree boundary line may match a 45-degree intra prediction mode from bottom-left to upper-right, such as mode 30 in AVS3, or a 225-degree intra prediction mode from upper-right to bottom-left, such as mode 6 in AVS3. If the weight matrix has only one value of weights, the weight matrix may match a mode without an obvious angle, such as DC mode, Planar mode, Bilinear mode, etc. Thus, the weight matrix derivation mode may match some intra prediction modes, and the weight matrix derivation mode may be used to assist in decoding of the intra prediction modes.

It should be noted that in this disclosure, the weight matrix derivation mode may also be the index of the weight matrix, for example, the 56 modes of AWP may be considered as 56 weight matrix derivation modes.

By way of example, in this disclosure, a mapping table may be constructed to further represent the mapping relationship between weight matrix derivation modes and intra angular prediction modes. Specifically, the boundary lines for multiple modes of AWP and GPM are at the same angle, for example, for AWP of AVS3, the boundary lines for every 8 modes are at the same angle. There are eight angles of the boundary lines for 56 AWP modes. The index of the boundary line angle may be obtained by taking the mode number of the weight matrix derivation mode modulo 8 (%8). For example, the above Table 1 is a mapping table taking angular modes in AVS3 as an example. The indices 0 and 1 of boundary line angles correspond to two intra angular prediction modes respectively: one from upper right to bottom left and one from upper left to bottom right. In a specific implementation, an approximately corresponding intra angular prediction mode may be found for another boundary line angle index, or all indices of boundary line angle correspond to one intra angular prediction mode.

For a weight matrix, in addition to the high possibility of using the intra angular prediction mode corresponding to the boundary line, there is also a high possibility of using some intra angular prediction modes related to the boundary line, such as an intra angular prediction mode corresponding to an angle close to the boundary line or an angle perpendicular to the boundary line. The encoder may use the correlation between the weight matrices and the intra angular prediction modes to construct the MPM list of the IWCP mode. For example, when constructing the MPM list of the IWCP mode, if a list length of the MPM list is 4, then candidate modes corresponding to the boundary line angle indexes in Table 2 above may be added to the MPM list.

It is to be understood that, based on Table 2 above, the number of candidate modes corresponding to each boundary line angle index is equal to the length of the MPM list, which can ensure that the MPM list can be filled even if none of intra prediction modes of the neighbouring blocks for reference is available. For example, if the length of the MPM list is 4, the number of candidate modes corresponding to each boundary line angle index may be set to 4.

Further, in the present disclosure, when constructing the MPM list based on the first candidate mode, the second candidate mode, and the preset angular prediction mode set, the encoder may also filter the first candidate mode(s) based on the preset angular prediction mode set to obtain a filtered candidate mode, and construct the MPM list based on the filtered candidate mode and the second candidate mode.

Specifically, in the present disclosure, when filtering the first candidate mode based on the preset angular prediction mode set to obtain the filtered candidate mode, if the first candidate mode belongs to the preset angular prediction mode set, then the encoder determines the first candidate mode as the filtered candidate mode, and if the first candidate mode is an intra angular prediction mode and does not belong to the preset angular prediction mode set, then the encoder determines a substitute mode of the first candidate mode from the preset angular prediction mode set and determines the substitute mode as the filtered candidate mode.

Further, in the present disclosure, if the first candidate mode is not an intra angular prediction mode, then the encoder may directly cancel the first candidate mode.

It is to be understood that in the present disclosure, since the preset angular prediction mode set to which the first intra prediction mode and the second intra prediction mode belong is a subset of all the intra angular prediction modes and does not include an intra non-angular prediction mode, the selection of the MPMs of the current block, i.e., the method of constructing the MPM list, needs to be adjusted accordingly with respect to the IWCP mode. Specifically, the encoder needs to consider the intra prediction mode of the neighbouring block surrounding the current block when constructing the MPM list. For example, the neighbouring blocks is a left neighbouring block, a top neighbouring block, a top left neighbouring block, a top right neighbouring block, a bottom left neighbouring block, and so on. Due to spatial correlation, if a certain prediction mode is used for a neighbouring block, there will be a higher probability of using the same or similar prediction mode for the current block.

Optionally, since both the first intra prediction mode and the second intra prediction mode of the IWCP mode can only be intra angular prediction modes, when the intra prediction mode used for the reference neighbouring block is an intra non-angular prediction mode, i.e., the first candidate mode is a mode that is not an intra angular prediction mode, the encoder does not use the intra non-angular prediction mode used for the reference block in constructing the MPM list for the current block, i.e., does not add that intra non-angular prediction mode to the MPM list for the current block.

Optionally, since the preset angular prediction mode set to which the first intra prediction mode and the second intra prediction mode belong is a subset of all intra angular prediction modes, when the intra prediction mode used for the reference neighbouring block is an intra angular prediction mode not included in the preset angular prediction mode set, i.e., the first candidate mode is an intra angular prediction mode and does not belong to the preset angular prediction mode set, then when constructing the MPM list for the current block, the encoder may convert the intra angular prediction mode not included in the preset angular prediction mode set into an intra angular prediction mode of a similar angle within the preset angular prediction mode set, and then add to the MPM list. Taking AVS3 as an example, if the preset angular prediction mode set limits the first intra prediction mode and the second intra prediction mode to only intra angular prediction modes numbered from 4 to 31, and an intra angular prediction mode numbered 43 is used for a neighbouring block of the current block, then the encoder may add the intra angular prediction numbered 12, which corresponding to an angle similar to the intra angular prediction numbered 43, to the MPM list for the current block in the IWCP mode.

Further, in an implementation of the present disclosure, to construct the MPM list based on the filtered candidate mode and the second candidate mode, if the filtered candidate mode satisfies a preset addition condition, the filtered candidate mode is added to the MPM list. If the MPM list does not reach a preset list length L, and the second candidate mode satisfies the preset addition condition, the second candidate mode is added to the MPM list. L is an integer greater than or equal to 1.

Exemplarily, in the present disclosure, the value of L may be 4, i.e., the preset list length of the MPM list is 4, or the MPM list includes 4 MPMs.

It will be appreciated that in implementations of the present disclosure, the encoder may sort the L modes in the MPM list in an ascending order of mode number.

It is to be noted that in implementations of the present disclosure, if the filtered candidate mode is different from any prediction mode in the MPM list, then the encoder may determine that the filtered candidate modes satisfies the preset addition condition. Accordingly, if the second candidate mode is different from any prediction mode in the MPM list, then the encoder may determine that the second candidate mode satisfies the preset addition condition.

It is to be understood that, in implementations of the present disclosure, the encoder may determine order parameters corresponding to neighbouring blocks when adding the filtered candidate modes corresponding to the neighbouring blocks to the MPM list. In accordance with the order parameters, the filtered intra candidate modes corresponding to the neighbouring blocks are sequentially added to the MPM list. The encoder may determine the corresponding order parameters in accordance with the spatial distance between the neighbouring blocks and the current block. For example, the closer the spatial distance between the neighbouring block and the current block, the stronger the correlation between the neighbouring block and the current block, and the earlier the addition process, that is, the smaller the order parameter. The farther the spatial distance between the neighbouring block and the current block, the weaker the correlation, and the later the addition process, that is, the larger the order parameter.

Further, in implementations of the present disclosure, after adding the filtered candidate mode and/or the second candidate mode to the MPM list, the encoder may also sort the L prediction modes in the MPM list in an ascending order of mode numbers.

Exemplarily, in the present disclosure, assume that the MPM list for the current block in the IWCP mode is IwcpMpm[4], i.e., the list length of the MPM list is 4, the index of the weight matrix derivation mode is IwcpIndex, the weight matrix derivation mode reuses the 56 derivation modes of the AWP, and the preset angular prediction mode set to which the first intra prediction mode and the second intra prediction mode belong includes intra angular prediction modes numbered from 4 to 31. Then the encoder may perform the following steps in sequence when constructing the MPM list for the current block:

In step S1: set an array cand_mode[10] and initialize all values of cand_mode to invalid values. For cand_mode, perform the following operations:

(a) If neighbouring block F is "present" and is a normal intra prediction block, cand_mode[0] is equal to an intra prediction mode of F;
(b) If neighbouring block G is "present" and is a normal intra prediction block, cand_mode[1] is equal to an intra prediction mode of G;
(c) If neighbouring block C is "present" and is a normal intra prediction block, cand_mode[2] is equal to an intra prediction mode of C;
(d) If neighbouring block A "present" and is a normal intra prediction block, cand_mode[3] is equal to an intra prediction mode of A;
(e) If neighbouring block B is "present" and is a normal intra prediction block, cand_mode[4] is equal to an intra prediction mode of B;
(f) If neighbouring block D is "present" and is a normal intra prediction block, cand_mode[5] is equal to an intra prediction mode of D;
(g) cand_mode[6] is equal to candidate mode 0 corresponding to IwcpIndex %8;
(h) cand_mode[7] is equal to candidate mode 1 corresponding to IwcpIndex %8;
(i) cand_mode[8] is equal to candidate mode 2 corresponding to IwcpIndex %8; and
(j) cand_mode[9] is equal to candidate mode 3 corresponding to IwcpIndex %8.

In the above, neighbouring block X (X is A, B, C, D, F or G) being "present" means that this block should be in the picture and that the block should belong to the same slice as block E; otherwise the neighbouring block is "absent". If the block is "absent" or has not been decoded, the block is "unavailable"; otherwise the block is "available". If the block in which a sample of the picture is located is "absent" or the sample has not been decoded, the sample is "unavailable"; otherwise, the sample is "available".

It is to be understood that in the present disclosure, the steps from (a) to (f) above form a determination process for the first candidate mode, and the steps from (g) to (j) above form a determination process for the second candidate mode, where the encoder may determine the second candidate mode with reference to Table 2 above.

In step S2: For i from 0 to 5, perform the following operations:

(a) If cand_mode[i] is less than 3 or cand_mode[i] is equal to 33, cand_mode[i] is set to an invalid value.

That is, if the first candidate mode is an intra non-angular prediction mode, then the encoder may cancel the first candidate mode, i.e., not use the first candidate mode.

(b) Otherwise, if cand_mode[i] is equal to 3, cand_mode[i] is set equal to 4.
(c) Otherwise, if cand_mode[i] is equal to 32, cand_mode[i] is set equal to 31.
(d) Otherwise, if cand_mode[i] is greater than 33, perform the following:
If cand_mode[i] is less than 44, cand_mode[i] is set equal to cand_mode[i]-30;
Otherwise, if cand_mode[i] is less than 58, cand_mode[i] is set equal to cand_mode[i]-33; and
Otherwise, cand_mode[i] is set equal to cand_mode[i]-34.

That is, if the first candidate mode is an intra angular prediction mode, but the first candidate mode does not belong to the preset angular prediction mode set, then the encoder may select a similar intra angular prediction mode from the preset angular prediction mode set as a substitute mode for the first candidate mode, and then use the substitute mode as the filtered candidate mode.

(e) Otherwise, the value of cand_mode[i] is not modified.

That is, if the first candidate mode belongs to the preset angular prediction mode set, then the encoder may directly use the first candidate mode, i.e., the first candidate mode is the filtered candidate mode.

It is to be understood that in the present disclosure, the above step S2 is the filtering process for the first candidate mode, and the filtered candidate mode corresponding to the first candidate mode is finally determined.

In step S3: set mpm_num to 0. For i from 0 to 9, perform the following:

(a) If cand_mode[i] is not an invalid value, perform the following:

Compare cand_mode[i] with IwcpMpm[j], where j is from 0 to mpm_num−1, and if cand_mode[i] is different from any IwcpMpm[j], perform the following:

1. set IwcpMpm[mpm_num] equal to cand_mode[i];
2. set mpm_num equal to mpm_num+1; and
3. if mpm_num is equal to 4, end step 3.

That is to say, in a case that there are less than 4 prediction modes in the MPM list, if the filtered candidate mode is not the same as any of the prediction modes in the MPM list, then the encoder may add the filtered candidate mode to the MPM list. If there are still less than 4 prediction modes in the MPM list after all the filtered candidate modes satisfying the preset addition condition have been added to the MPM list, then the encoder may continue to add the second candidate mode satisfying the preset addition condition to the MPM list, until the list length of the MPM list reaches 4.

In step S4, the four values of IwcpMpm[4] are sorted in an ascending order.

Finally, the encoder may sort the four intra angular prediction modes in the MPM list in ascending order of mode number.

It is to be understood that the present disclosure does not limit the execution order of the above blocks 202 and 203, i.e., the sequence between the process of determining the first intra prediction mode and the second intra prediction mode and the process of constructing the MPM list is not limited in the present disclosure.

At block 203, a first mode index and a second mode index of the current block are determined according to the first intra prediction mode, the second intra prediction mode, and the MPM list.

In implementations of the present disclosure, after determining the first intra prediction mode and the second intra prediction mode of the current block and constructing the MPM list for the current block, the encoder may further determine the first mode index and the second mode index of the current block according to the first intra prediction mode, the second intra prediction mode, and the MPM list.

It can be understood that, in the implementations of the present disclosure, the first mode index may be used to indicate a first intra prediction mode used for the current block, and the second mode index is used to indicate a second intra prediction mode used for the current block.

Specifically, the first mode index and the second mode index each have a value related to the number of possible intra angular prediction modes for the first intra prediction mode and the second intra prediction mode. For example, each of the first intra prediction mode and the second intra prediction mode may be one of 28 intra angular prediction modes with mode numbers from 4 to 31, and then both the value of the first mode index and the value of the second mode index may be in a range of 0-27.

Exemplarily, in the implementations of the present disclosure, a parameter iwcp_pred_mode0_index may be used to represent the first mode index, and a parameter iwcp_pred_mode1_index may be used to represent the second mode index.

Further, in implementations of the present disclosure, the encoder may determine a first mapping table between index values and binary strings. The first mapping table includes a binary string of a first length, a binary string of a second length, and a binary string of a third length respectively.

Exemplarily, in the present disclosure, the first length is 3 bits, the second length is 5 bits, and the third length is 6 bits.

It is noted that in the present disclosure, the first mapping table between index values and binary strings may be used to determine the values of the first mode index and the second mode index.

Optionally, in the present disclosure, for AVS3, if 28 intra angular prediction modes with mode numbers from 4 to 31 are used, i.e., a total of 28 modes are included in the preset angular prediction mode set, then the modes may be encoded in a manner of 4+8+16, i.e., 4 modes with the shortest codewords, 8 modes with the shorter codewords, and 16 modes with the longer codewords. In this case, the 4 modes with the shortest codewords are encoded using 3-bit codewords, i.e., using the first length, the 8 modes with the shorter codewords are encoded using 5-bit codewords, i.e., using the second length, and the 16 modes with the longer codewords are encoded using 6-bit codewords, i.e., using the third length.

It should be noted that in the present disclosure, the prediction angles of the 28 intra angular prediction modes with mode numbers from 4 to 31 essentially cover the entire range of commonly used angles. Additionally, the intra angular prediction modes with mode numbers from 4 to 31 are simpler than the intra angular prediction modes with mode numbers from 34 to 65. Further, encoding these 28 modes in the manner of 4+8+16 will not result in a waste of codewords. Therefore, the encoder may preferably define the preset angular prediction mode set in accordance with the 28 intra angular prediction modes with mode numbers from 4 to 31.

Further, in implementations of the present disclosure, if the list length of the MPM list for the current block is 4, then the 4 MPMs in the MPM list may be encoded using the binary strings of the first length, i.e., the 4 modes with the shortest codewords may be assigned to the 4 MPMs in the MPM list. Accordingly, other prediction modes in the preset angular prediction mode set and not included in in the MPM list may be encoded using the binary strings of the second length and the binary strings of the third length.

Optionally, in the present disclosure, for the other 24 intra angular prediction modes in the preset angular prediction mode set and other than the 4 MPMs in the MPM list, the encoder may evenly distribute the modes with the shorter codewords and the modes with the longer codewords. Specifically, the encoder may evenly distribute the 8 modes with the shorter codewords (binary strings of the second length) among the remaining 24 intra angular prediction modes. For example, one mode with the shorter codeword (binary string of the second length) is used every two modes with the longer codewords (binary string of the third length). Specifically, the serial numbers from 0 to 23 for the remaining 24 intra angular prediction modes may modulo 3 (%3), e.g., a mode with a serial number that modulo 3 equals to 2 uses a 5-bit codeword, i.e., the binary string of the second length, and a mode with a serial number that modulo 3 equals to 0 or 1 uses a 6-bit codeword, i.e., the binary string of the third length.

Exemplarily, in the present disclosure, if 28 intra angular prediction modes with mode numbers from 4 to 31 are used, i.e., a total of 28 modes are included in the preset angular prediction mode set, then the first mapping table between the index values and the binary strings may be as illustrated in Table 3 above, where the first length is 3 bits, the second length is 5 bits, and the third length is 6 bits.

In this case, the first bit may be used to indicate whether it is an MPM. For example, "1" represents an MPM, and "0" represents a non-MPM. If the first intra prediction mode is an MPM, and assuming that there are 4 MPMs in the MPM list, then 2 bits may be used to indicate which MPM in the MPM list the first intra prediction mode uses. For example, "00, 01, 10, 11" represent the first MPM, the second MPM, the third MPM, and the fourth MPM in the MPM list, respectively.

Further, in the present disclosure, a binary string with a bit flag of 0 is encoded using a context model, and a binary string with a bit flag other than 0 is encoded without the context model. The value of the bit flag may indicate how many bits have been encoded, and the bit flag may be represented by binIdx.

It should be noted that in the present disclosure, at the encoding side, when performing binarization according to Table 3, binary strings with binIdx of 0 may be encoded using a context model, while binary strings with binIdx other than 0 are encoded using an equal probability model or a bypass mode.

Further, in this disclosure, when determining the first mode index and the second mode index of the current block according to the first intra prediction mode, the second intra prediction mode, and the MPM list, if a mode number of the first intra prediction mode is the same as a mode number of the m-th mode in the MPM list, m is assigned to the value i of the first mode index; and if the mode number of the first intra prediction mode is different from a mode number of any mode in the MPM list, the value i of the first mode index is determined according to the MPM list, and the first mode index is determined according to the first mapping table and the value i. m is an integer greater than or equal to 0 and less than L.

That is, in this disclosure, if the mode number of the first intra prediction mode is the same as a mode number of one MPM in the MPM list, then the value i of the first mode index may be directly set as an order m of the MPM. For example, if the first intra prediction mode is the same as the second mode in the MPM list, set i=2.

Specifically, in the disclosure, when determining the value i of the first mode index, the encoder assigns a difference value between the mode number of the first intra prediction mode and 4 to i when the mode number of the first intra prediction mode is greater than or equal to a mode number of the fourth mode in the MPM list; assigns a difference value between the mode number of the first intra prediction mode and 3 to i when the mode number of the first intra prediction mode is less than the mode number of the fourth mode in the MPM list and greater than or equal to a mode number of the third mode in the MPM list; assigns a difference value between the mode number of the first intra prediction mode and 2 to i when the mode number of the first intra prediction mode is less than the mode number of the third mode in the MPM list and greater than or equal to a mode number of the second mode in the MPM list; assigns a difference value between the mode number of the first intra prediction mode and 1 to i when the mode number of the first intra prediction mode is less than the mode number of the second mode in the MPM list and greater than or equal to a mode number of the first mode in the MPM list; and assigns the mode number of the first intra prediction mode to i when the mode number of the first intra prediction mode is less than the mode number of the first mode in the MPM list.

For example, in the disclosure, if the mode numbers of the four MPMs in the MPM list are 4, 8, 12, 16, and the mode number of the first intra prediction mode is 9, the encoder may compare the mode number of the first intra prediction mode with the mode numbers of the four MPMs respectively. Specifically, 9 is greater than the mode number of the second MPM and less than the mode number of the third MPM, then the value i of the first mode index is 9−2=7.

For example, in the disclosure, if the mode numbers of the four MPMs in the MPM list are 4, 8, 12, 16, and the mode number of the first intra prediction mode is 15, the encoder may compare the mode number of the first intra prediction mode with the mode numbers of the four MPMs respectively. Specifically, 15 is greater than the mode number of the third MPM and less than the mode number of the fourth MPM, then the value i of the first mode index is 15-3=12.

It can be understood that in this disclosure, after determining the value i of the first mode index corresponding to the prediction mode in the first intra prediction mode, the encoder may determine the first mode index according to the first mapping table and i. Specifically, the encoder may perform binarization on i according to the first mapping table illustrated in Table 3 above to determine the first mode index.

Further, in this disclosure, when determining the first mode index and the second mode index of the current block according to the first intra prediction mode, the second intra prediction mode, and the MPM list, if a mode number of the second intra prediction mode is the same as a mode number of the m-th mode in the MPM list, m is assigned to the value j of the first mode index; and if the mode number of the second intra prediction mode is different from a mode number of any mode in the MPM list, the value j of the first mode index is determined according to the MPM list, and the second mode index is determined according to the first mapping table and the value j. m is an integer greater than or equal to 0 and less than L.

That is, in this disclosure, if the mode number of the second intra prediction mode is the same as a mode number of one MPM in the MPM list, then the value j of the first mode index may be directly set as an order m of the MPM. For example, if the second intra prediction mode is the same as the third mode in the MPM list, set j=3.

Specifically, in the disclosure, when determining the value j of the first mode index, the encoder assigns a difference value between the mode number of the second intra prediction mode and 4 to j when the mode number of the second intra prediction mode is greater than or equal to a mode number of the fourth mode in the MPM list; assigns a difference value between the mode number of the second intra prediction mode and 3 to j when the mode number of the second intra prediction mode is less than the mode number of the fourth mode in the MPM list and greater than or equal to a mode number of the third mode in the MPM list; assigns a difference value between the mode number of the second intra prediction mode and 2 to j when the mode number of the second intra prediction mode is less than the mode number of the third mode in the MPM list and greater than or equal to a mode number of the second mode in the MPM list; assigns a difference value between the mode number of the second intra prediction mode and 1 to j when the mode number of the first second prediction mode is less than the mode number of the second mode in the MPM list and greater than or equal to a mode number of the first mode in the MPM list; and assigns the mode number of the second intra prediction mode to j when the mode number of the second intra prediction mode is less than the mode number of the first mode in the MPM list.

For example, in the disclosure, if the mode numbers of the four MPMs in the MPM list are 4, 8, 12, 16, and the mode number of the second intra prediction mode is 17, the encoder may compare the mode number of the second intra prediction mode with the mode numbers of the four MPMs respectively. Specifically, 17 is greater than the mode number of the fourth MPM, then the value j of the first mode index is 17−4=13.

For example, in the disclosure, if the mode numbers of the four MPMs in the MPM list are 4, 8, 12, 16, and the mode number of the second intra prediction mode is 6, the encoder may compare the mode number of the second intra prediction mode with the mode numbers of the four MPMs respectively. Specifically, 6 is greater than the mode number of the first MPM and less than the mode number of the second MPM, then the value j of the first mode index is 6-1=5.

It can be understood that in this disclosure, after determining the value j of the second mode index corresponding to the second intra prediction mode, the encoder may determine the second mode index according to the first mapping table and j. Specifically, the encoder may perform binarization on j according to the first mapping table illustrated in Table 3 above to determine the second mode index.

Exemplarily, in the present disclosure, if the IWCP mode is used for the current block, the length of the MPM list for the current block is 4, i.e., L=4, where the four modes in the MPM lists are sorted according to an ascending order of mode numbers, the preset angular prediction mode set includes 28 intra angular prediction modes with mode numbers from 4 to 31, then the encoder may first determine the first intra prediction mode as IwcpPredMode0 and the second intra frame prediction mode as IwcpPredMode1, and then further determine the first mode index iwcp_pred_mode0_index and the second mode index iwcp_pred_mode1_index according to the first intra prediction mode IwcpPredMode0 and the second intra frame prediction mode IwcpPredMode1, where the values of iwcp_pred_mode0_index and iwcp_pred_mode1_index each is in a range from 0 to 27.

After determining the first intra prediction mode IwcpPredMode0 used for the IWCP mode of the current block, the encoder determines the first mode iwcp_pred_mode0_index according to the following operations:

1. If IwcpPredMode0 is equal to IwcpMpm [m], where m is greater than or equal to 0 and less than 4, then the value i of iwcp_pred_mode0_index is equal to m.

That is, if the first intra prediction mode is the same as the m-th MPM in the MPM list, m may be assigned to i directly, i.e., i=m.

2. If IwcpPredMode0 is not equal to IwcpMpm [m], the value i of iwcp_pred_mode0_index is equal to IwcpPredMode0<IwcpMpm[0] ? IwcpPredMode0: IwcpPredMode0<IwcpMpm[1] ? IwcpPredMode0-1: IwcpPredMode0<IwcpMpm[2] ?IwcpPredMode0-2: IwcpPredMode0<IwcpMpm[3] ? IwcpPredMode0-3: IwcpPredMode0-4.

3. Perform binarization on the value i of iwcp_pred_mode0_index according to Table 3 to determine iwcp_pred_mode0_index in the form of binary string.

Specifically, in binarization of the value i of iwcp_pred_mode0_index in accordance with Table 3, the same index value as i may be determined from the left column of Table 3, and then the binary string iwcp_pred_mode0_index may be determined from the right column of the same row.

Correspondingly, after determining the second intra prediction mode IwcpPredMode1 used for the IWCP mode of the current block, the encoder determines the second mode iwcp_pred_mode1_index according to the following operations:

1. If IwcpPredMode1 is equal to IwcpMpm [m], where m is greater than or equal to 0 and less than 4, then the value j of iwcp_pred_mode1_index is equal to m.

That is, if the second intra prediction mode is the same as the m-th MPM in the MPM list, m may be assigned to j directly, i.e., i=m.

2. If IwcpPredMode1 is not equal to IwcpMpm [m], the value j of iwcp_pred_mode1_index is equal to IwcpPredMode1<IwcpMpm[0] ? IwcpPredMode1 IwcpPredMode1<IwcpMpm[1] ? IwcpPredMode1-1: IwcpPredMode1<IwcpMpm[2] ?IwcpPredMode1-2: IwcpPredMode1<IwcpMpm[3] ? IwcpPredMode1-3: IwcpPredMode1-4.

3. Perform binarization on the value j of iwcp_pred_mode1_index according to Table 3 to determine iwcp_pred_mode1_index in the form of binary string.

Specifically, in binarization of the value j of iwcp_pred_mode1_index in accordance with Table 3, the same index value as j may be determined from the left column of Table 3, and then the binary string iwcp_pred_mode1_index may be determined from the right column of the same row.

Further, in implementations of the present disclosure, since the first intra prediction mode and the second intra prediction mode are required in the IWCP mode for determining the prediction value of the current block, the first intra prediction mode and the second intra prediction mode may share one preset angular prediction mode set, and may also share the same MPM list. However, the first intra prediction mode and the second intra prediction mode are not the same in the IWCP mode. Therefore, the second intra prediction mode may be coded with reference to the first intra prediction mode. Specifically, the first intra prediction mode may be excluded when determining the second intra prediction mode.

It is to be understood that in the present disclosure, for the 28 intra angular prediction modes, the probability of the 4 MPMs in the MPM list is high (the probability of the first intra prediction mode being one of the 4 MPMs in the MPM list is about 50%, and the probability of the second intra prediction mode being one of the 4 MPMs in the MPM list is about 50%) in the above coding manner of 4+8+16. If both the first intra prediction mode and the second intra prediction mode are MPMs in the MPM list, then when determining the second intra prediction mode, it is only necessary to choose one of the other 3 MPMs in the MPM list other than the first intra prediction mode. Thus, the original four choices requiring four 3-bit codewords may be reduced to three choices requiring one 2-bit codeword and two 3-bit codewords.

Correspondingly, if neither the first intra prediction mode nor the second intra prediction mode is an MPM in the MPM list, then for the second intra prediction mode, one mode may also be removed from the 24 intra angular prediction modes of 8+16, although this has less impact.

As can be seen, for the case where both the first intra prediction mode and the second intra prediction mode are MPMs in the MPM list, it is possible to exclude the first intra prediction mode in advance when determining the second intra prediction mode, which allows for a reduction in overhead.

Optionally, in implementations of this disclosure, when the encoder determines the first mode index and the second mode index of the current block according to the first intra prediction mode, the second intra prediction mode, and the MPM list, if a mode number of the second intra prediction mode is the same as a mode number of the m-th mode in the MPM list, m is assigned to the value j of the first mode index; and if the mode number of the second intra prediction mode is different from a mode number of any mode in the MPM list, the value j of the first mode index is determined according to the MPM list, and the second mode index is determined according to the first mapping table and the value j.

Specifically, in the present disclosure, when determining the second mode index based on the first mapping table, the second mapping table between index values and binary strings, and j, if i is less than L and less than j, the encoder determines the second mode index by performing binarization on j according to the second mapping table after subtracting 1 from j. If j is greater than or equal to L, the encoder determines the second mode index by performing binarization on j according to the first mapping table.

Further, in implementations of the present disclosure, the encoder may determine the second mapping table between index values and binary strings, where the second mapping table includes a binary string of a first length, a binary string of a second length, a binary string of a third length, and a binary string of a fourth length.

Exemplarily, in the present disclosure, the first length is 3 bits, the second length is 5 bits, the third length is 6 bits, and the fourth length is 2 bits.

It is noted that in the present disclosure, the second mapping table between index values and binary strings is only used to determine the value of the second mode index.

Optionally, in the present disclosure, the second mapping table between index values and binary strings may be illustrated in Table 4 above, where the first length is 3 bits, the second length is 5 bits, the third length is 6 bits, and the fourth length is 2 bits.

It should be noted that in the present disclosure, at the encoding side, when performing binarization according to Table 4, binary strings with binIdx of 0 may be encoded using a context model, while binary strings with binIdx other than 0 are encoded using an equal probability model or a bypass mode.

Exemplarily, in the present disclosure, if the IWCP mode is used for the current block, the length of the MPM list for the current block is 4, i.e., L=4, where the four modes in the MPM lists are sorted according to an ascending order of mode numbers, the preset angular prediction mode set includes 28 intra angular prediction modes with mode numbers from 4 to 31, then the encoder may first determine the first intra prediction mode as IwcpPredMode0 and the second intra frame prediction mode as IwcpPredMode1, and then further determine the first mode index iwcp_pred_mode0_index and the second mode index iwcp_pred_mode1_index according to the first intra prediction mode IwcpPredMode0 and the second intra frame prediction mode IwcpPredMode1.

After determining the first intra prediction mode IwcpPredMode0 used for the IWCP mode of the current block, the encoder determines the first mode iwcp_pred_mode0_index according to the following operations:

1. If IwcpPredMode0 is equal to IwcpMpm [m], where m is greater than or equal to 0 and less than 4, then the value i of iwcp_pred_mode0_index is equal to m.

That is, if the first intra prediction mode is the same as the m-th MPM in the MPM list, m may be assigned to i directly, i.e., i=m.

2. If IwcpPredMode0 is not equal to IwcpMpm [m], the value i of iwcp_pred_mode0_index is equal to IwcpPredMode0<IwcpMpm[0] ? IwcpPredMode0: IwcpPredMode0<IwcpMpm[1] ? IwcpPredMode0-1: IwcpPredMode0<IwcpMpm[2] ?IwcpPredMode0-2: IwcpPredMode0<IwcpMpm[3] ? IwcpPredMode0-3: IwcpPredMode0-4.
3. Perform binarization on the value i of iwcp_pred_mode0_index according to Table 3 to determine iwcp_pred_mode0_index in the form of binary string.

Specifically, in binarization of the value i of iwcp_pred_mode0_index in accordance with Table 3, the same index value as i may be determined from the left column of Table 3, and then the binary string iwcp_pred_mode0_index may be determined from the right column of the same row.

Correspondingly, if the second intra prediction mode is determined according to the first intra prediction mode, after determining the second intra prediction mode IwcpPredMode1 used for the IWCP mode of the current block, the encoder determines the second mode iwcp_pred_mode1_index according to the following operations:

1. If IwcpPredMode1 is equal to IwcpMpm [m], where m is greater than or equal to 0 and less than 4, then the value j of iwcp_pred_mode1_index is equal to m.

That is, if the second intra prediction mode is the same as the m-th MPM in the MPM list, m may be assigned to j directly, i.e., i=m.

2. If IwcpPredMode1 is not equal to IwcpMpm [m], the value j of iwcp_pred_mode1_index is equal to IwcpPredMode1<IwcpMpm[0] ? IwcpPredMode1 IwcpPredMode1<IwcpMpm[1] ? IwcpPredMode1-1: IwcpPredMode1<IwcpMpm[2] ?IwcpPredMode1-2: IwcpPredMode1<IwcpMpm[3] ? IwcpPredMode1-3: IwcpPredMode1-4.
3. If the value j of iwcp_pred_mode0_index is less than 4, then:
   a. If iwcp_pred_model index is greater than or equal to iwcp_pred_mode0_index, iwcp_pred_mode1_index is equal to iwcp_pred_mode1_index−1;
   b. Perform binarization on the value j of iwcp_pred_mode1_index according to Table 4 to determine iwcp_pred_mode1_index in the form of binary string.
3. If the value j of iwcp_pred_mode0_index is greater than or equal to 4, perform binarization on the value j of iwcp_pred_mode1_index according to Table 3 to determine iwcp_pred_mode1_index in the form of binary string.

It can be seen that if the determination of the second intra prediction mode is based on the first intra prediction mode, then iwcp_pred_mode1_index is dependent on iwcp_pred_mode0_index. Specifically, taking Table 4 as an example, if the first intra prediction mode and the second intra prediction mode are both MPMs in the MPM list, then there are only three MPMs available for the second intra prediction mode. Therefore, the MPM may be indicated by one or two bits, e.g., "00, 01, 10" indicating the remaining first, second, and third MPM, respectively. It can be seen that, as one possibility is excluded, the coding method or binarization or inverse binarization method can be changed to save overhead.

It is to be noted that, in implementations of the present disclosure, if the preset angular prediction mode set includes 28 intra angular prediction modes with mode numbers from 4 to 31 and the length of the MPM list is 4, then when determining the first mapping table between index values and binary strings according to binary strings of the first length, the second length, and the third length, the binary strings of the first length, i.e., the shortest codewords, may be used for the 4 MPMs in the MPM list. Then, the binary strings of the second length may be used for 8 intra angular prediction modes selected from the remaining 24 intra angular prediction modes, and the binary strings of the third length may be used for 16 intra angular prediction modes selected from the remaining 24 intra angular prediction modes.

Specifically, in the present disclosure, for the remaining 24 intra angular prediction modes, according to an ascending order of the mode numbers, shorter codewords, i.e., binary strings of the second length, may be used for the prediction modes corresponding to the first 8 modes, and then longer codewords, i.e., binary strings of the third length, may be used for the prediction modes corresponding to the subsequent 16 modes.

Exemplarily, in the present disclosure, the first mapping table between index values and binary strings illustrated in Table 3 above may be replaced with Table 5 above, where Table 5 that represents the first mapping relationships between the index values and the binary strings may also be used to determine the value of the first mode index and the value of the second mode index.

Accordingly, it is also possible to replace Table 4, which is the second mapping table between the index values and the binary strings above, with the Table 6 above, where Table 6 illustrating the second mapping relationships between the index values and the binary strings may also be used for determining the value of the second mode index.

It will be appreciated that in the present disclosure, if 28 intra angular prediction modes with mode numbers from 4 to 31 are used, i.e., the preset angular prediction mode set includes 28 modes, then the coding manner of 4+8+16 may be used, that is, 4 modes with 3 bits, 8 modes with 5 bits, and 16 modes with 6 bits.

Optionally, in the present disclosure, if a total of 20 modes are included in the preset angular prediction mode set, the modes may be represented using four 3-bit codewords and sixteen 5-bit codewords.

Optionally, in the present disclosure, if a total of 36 modes are included in the preset angular prediction mode set, the modes may be represented using four 3-bit codewords and thirty-two 6-bit codewords. For example, in AVS3, 36 intra angular prediction modes with mode numbers from 4 to 31, 42-45, and 56-59 may be used.

It should be noted that, in the present disclosure, if all the modes in the preset angular prediction mode set are represented by the set of binary strings as illustrated in Table 3 or Table 4, then a "codeword" may be understood as a binary string. The length of the codeword may be understood as the length of the binary string. Another representation is a combination of a binary string and a flag. For example, a binary MPM_flag is used to indicate whether the current mode is an MPM mode or not, i.e., if MPM_flag is 1, it means that the current mode is an MPM mode, and if MPM_flag is 0, it means that the current mode is not an MPM mode. If the current mode is an MPM mode, there are 4 possibilities for MPM, and then a binary string of 2 bits is used to indicate the current mode being which of the MPMs. In this case, the codeword may be understood as the combination of the flag and the binary string, and the length of the codeword may be understood as the length of the combination of the flag and the binary string.

At block 204, the first mode index and the second mode index are signalled into the bitstream.

In implementations of the present disclosure, when the first mode index indicating the first intra prediction mode and the second mode index indicating the second intra prediction mode, the encoder may then signal the first mode index and the second mode index into a bitstream and transmit the bitstream to the decoding side, to enable the decoder to determine a prediction value of a current block according to the first mode index and the second mode index determined by decoding the bitstream.

Further, in implementations of the present disclosure, the encoder needs to determine the weight matrix for the current block, so that after determining the first intra prediction mode and the second intra prediction mode used for the current block, the encoder further determines the prediction value for the current block according to the first intra prediction mode, the second intra prediction mode, and the weight matrix.

It may be understood that in the present disclosure, when determining the prediction value of the current block according to the first intra prediction mode, the second intra prediction mode, and the weighting matrix, the encoder may first determine a first prediction value of the current block according to the first intra prediction mode, determine a second prediction value of the current block according to the second intra prediction mode, and then weight the first prediction value and the second prediction value using the weight matrix to obtain the prediction value of the current block.

Further, in implementations of the present disclosure, after determining the prediction value of the current block, the encoder may also calculate a difference between the true value and the prediction value of the current block to obtain the difference value, so that the prediction difference, i.e., the residual, of the current block may be determined.

That is, in the disclosure, the encoder may calculate the difference between the true value and the prediction value of the current block to obtain the residuals, and the residuals will be transformed, quantized, entropy encoded, and signalled into the bitstream to be transmitted to the decoding side.

Specifically, in the present disclosure, the encoder may determine the weight matrix for the current block according to the weight matrix derivation mode of the current block.

It is to be understood that in the present disclosure, both the first intra prediction mode and the second intra prediction mode may be intra angular prediction modes, i.e., two different intra angular prediction modes are used in the present disclosure. The first intra prediction mode and the second intra prediction mode are then used to generate a first prediction block and a second prediction block, respectively. Further, the prediction block of the current block is determined based on the first prediction block and the second prediction block in combination with the weight matrix.

Further, in implementations of the present disclosure, not all points in each of possible weight matrices have the same weight values. In other words, at least one of the possible weight matrices contains at least two different weight values.

It should be noted that in implementations of the disclosure, the encoder may determine the weight matrix using a method similar to GPM or AWP. Specifically, in the same coding standard or codec, if GPM or AWP is used, then such method may also be used to determine the weight matrix, so that some common logics may be reused. For instance, AWP is used in inter prediction in AVS3, so it is possible to use AWP for determining the weight matrix in AVS3. Additionally, other methods different from GPM or AWP could also be used in the same coding standard or codec, for example, using different numbers of modes, different algorithms for blending areas, different parameters, etc. Inter prediction utilizes temporal correlation, where a reconstructed block in the reference picture is used as the reference block. Intra prediction utilizes spatial correlation, where reconstructed samples around the current block are used as reference samples. The closer the distance in space, the stronger the correlation, while the farther the distance, the weaker the correlation. Therefore, if a certain weight matrix makes that a prediction value is obtained using sample positions that are far from reference sample(s), then such weight matrix may not be able to produce more suitable prediction values than existing technology, and thus such weight matrix may not be used. Instead, the weight matrix may be used in inter prediction.

The implementations of the present disclosure provide the intra prediction method in which the codec can determine two different prediction blocks of the current block using two different intra angular prediction modes, and then combine the two different prediction blocks by various weight matrices to obtain the more complex prediction block. In this way, while improving the accuracy of intra prediction, the cost of hardware implementation can be reduced, and a simple and efficient coding method can be achieved, thus improving the compression performance.

Based on the above implementations, in a further implementation of the present disclosure, after determining that the IWCP mode is used for the current block, the encoder may further determine an intra prediction mode parameter of the current block, where the intra prediction mode parameter is used for determining whether the IWCP mode is used for the current block. Then the intra prediction mode parameter may then be signalled into the bitstream.

It should be noted that in the implementations of the disclosure, the intra prediction mode parameter may indicate whether the IWCP mode can be used for the current block, i.e., whether two different intra angular prediction modes can be used for the current block to determine a prediction value of the current block.

It may be understood that in the implementations of the present disclosure, the intra prediction mode parameter may be understood as a flag indicating whether the IWCP mode is used or not. Specifically, the encoder may determine a variable as the intra prediction mode parameter, so that the intra prediction mode parameter may be determined by the value of the variable.

For example, in the disclosure, if the IWCP mode is used for the current block, the encoder may configure the value of the intra prediction mode parameter to indicate that the IWCP mode is used for the current block. Specifically, the encoder may set the value of the variable as 1.

For example, in the disclosure, if the IWCP mode is not used for the current block, the encoder may configure the value of the intra prediction mode parameter to indicate that the IWCP mode is not used for the current block. Specifically, the encoder may set the value of the variable as 0.

Further, in implementations of the present disclosure, after completing the setting of the intra prediction mode parameter, the encoder may then signal the intra prediction mode parameter into the bitstream and transmit the bitstream to the decoder, which can enable the decoder to obtain the intra prediction mode parameter after decoding the bitstream.

That is, in implementations of the present disclosure, at the encoder side, predictive coding is performed for the current block, during which the intra prediction mode parameter of the current block can be determined, and the corresponding intra prediction mode parameter is written into the bitstream that will be transmitted from the encoder to the decoder.

It may be understood that in the implementations of this disclosure, before intra prediction of the current block, the encoder may first determine the prediction mode parameter, and then use the prediction mode parameter to determine which specific encoding mode is used for the current block.

Furthermore, in the implementations of this disclosure, when determining the prediction mode parameter of the current block, the encoder may first use multiple different prediction modes to predict the current block separately, and then calculate the rate-distortion cost corresponding to each of the multiple prediction modes. Finally, the encoder may select the minimum rate-distortion cost from the calculated multiple rate-distortion costs and determine a prediction mode corresponding to the minimum rate-distortion cost as the prediction mode parameter of the current block.

That is to say, for the current block, the encoder may use multiple prediction modes separately to encode the colour component to-be-predicted.

Moreover, in the implementations of this disclosure, after the encoder uses multiple prediction modes to encode the current block separately, the encoder may obtain the rate-distortion cost corresponding to each prediction mode. Then, the encoder may select the minimum rate-distortion cost from the obtained multiple rate-distortion costs and determine the prediction mode corresponding to the minimum rate-distortion cost as the prediction mode parameter of the current block. Thus, the determined prediction mode may be used to encode the current block, and in this prediction mode, the prediction residual may be small, which may improve the coding efficiency.

Furthermore, in the implementations of this disclosure, at the encoding side, when the encoder attempts to obtain a certain prediction block by intra prediction, the encoder will also attempt to obtain a cost of encoding using the IWCP mode. When attempting to obtain the cost of encoding using the IWCP mode, the encoder will attempt to obtain the costs in all or part of possible cases and then select the minimum cost as the cost of encoding using the IWCP mode.

It should be noted that in the implementations of this disclosure, the above-described all possible cases include a combination of three variables, which are: the first intra prediction mode for the current block is all possible prediction modes, the second intra prediction mode for the current block is all possible prediction modes, and the weight matrix derivation mode is all possible modes.

It is to be understood that in the present disclosure, the first intra prediction mode and the second intra prediction mode are two completely different intra angular prediction modes, and the encoder may limit the intra angular prediction modes that can be used in the IWCP mode, as well as limiting the number of weight matrix derivation modes that can be used in the IWCP mode. In this way, the number of possible cases will be reduced accordingly, with a corresponding reduction in the complexity at the encoding side.

For example, in this disclosure, assuming that there are 66 prediction modes available for the IWCP mode, the first intra prediction mode has 66 possible possibilities, and since the second intra prediction mode is different from the first intra prediction mode, the second intra prediction mode has 65 possible possibilities. Assuming that there are 56 possible weight matrix derivation modes (taken AWP as an example), this disclosure may use any two different intra prediction modes and any one weight matrix derivation mode, and thus there are 66×65×56 possibilities. Assume that the intra angular prediction modes that can be used are limited, that is, the range of modes in the preset angular prediction mode set is limited, for example, the preset angular prediction mode set includes only 28 intra angular prediction mode with mode numbers from 4 to 31. In this case, the first intra prediction mode has 28 possible possibilities, and since the second intra prediction mode is different from the first intra prediction mode, the second intra prediction mode has 27 possible possibilities. Assuming that there are 56 possible weight matrix derivation modes (taken AWP as an example), this disclosure may use any two different intra prediction modes and any one weight matrix derivation mode, and thus there are 28×27×56 possibilities.

Furthermore, in the implementations of this disclosure, the encoder may perform rate-distortion optimization (RDO) on all possible cases of the IWCP mode to determine a combination with the minimum cost, where each combination includes the first intra prediction mode, the second intra prediction mode, and the weight matrix derivation mode.

Optionally, to reduce the time consumption of RDO, a preliminary selection may be made on all possible cases of the IWCP mode mentioned above, for example, by using SAD, SATD, etc. as approximate cost, to determine a set number of candidate combinations of the first intra prediction mode, the second intra prediction mode, and the weight matrix derivation mode. Then, RDO may be used for fine selection to determine the combination of the first intra prediction mode, the second intra prediction mode, and the weight derivation mode with the minimum cost. This allows for reducing the number of attempts by using some fast algorithms during preliminary selection. For example, if one intra angular prediction mode results in a high cost, several neighbouring intra prediction modes of this intra angular prediction mode will not be attempted.

It can be understood that, in the above preliminary selection and fine selection in the present disclosure, the cost may include the cost of an overhead of encoding the first intra prediction mode, the second intra prediction mode, and the weight matrix derivation mode in the bitstream. It is also possible to use an estimated cost of the overhead of the first intra prediction mode, the second intra prediction mode, and the weight matrix derivation mode in the bitstream during the preliminary selection. For example, the number of bits of the first or second intra prediction mode is estimated according to whether the first or second intra prediction mode is an MPM, or the number of bits of the first or second intra prediction mode is estimated according to the sorting of the intra prediction modes. In RDO, the cost may be obtained through more accurate trial coding. In this process, the method of constructing the MPM list or sorting the intra prediction modes in the present disclosure is needed.

It can be understood that in this disclosure, during both preliminary selection and fine selection, the first prediction block will be determined according to the first intra prediction mode, the second prediction block will be determined according to the second intra prediction mode, the weight will be derived according to the weight matrix derivation mode, and the prediction block in this disclosure will be determined according to the first prediction block, the second prediction block, and the weight. The SAD and SATD are determined by using the current block and the prediction block corresponding to the current block during preliminary selection of the SAD and SATD.

Further, in the implementations of the present disclosure, the encoder may first analyze the textures of the current block, for example, by using gradients. The analyzed data is used to help with preliminary selection. For example, among the textures of the current block, more prediction modes with directions similar to a direction that has a stronger texture will be selected in the above preliminary selection for trial. For example, among the textures of the current block, less or no prediction modes with directions similar to a direction that has a weaker texture will be selected for the preliminary selection.

It should be noted that in this disclosure, the cost for encoding using the IWCP mode includes a cost of codewords occupied by the first intra prediction mode, the second intra prediction mode, and the weight derivation mode in the bitstream, a cost of various flags and quantization coefficients that need to be transmitted in the bitstream generated from transform, quantization, entropy encoding, etc. for the prediction residuals, a distortion cost of the reconstruction block, and the like.

After determining the cost of encoding using the IWCP mode, if the cost of encoding using the IWCP mode is lower than that of other prediction modes, which may include other prediction modes or inter prediction modes, the encoder will select the IWCP mode as the prediction mode for the current block. Otherwise, the encoder will select some other prediction mode.

Further, in implementations of this disclosure, the encoder will attempt different block partition schemes to determine the encoding costs. If the IWCP mode is selected for a particular prediction block, a flag required by the IWCP mode, as well as the information for the first intra prediction mode, the second intra prediction mode, and the weight matrix derivation mode, may be signalled into the bitstream according to the syntax, and the prediction block may be predicted and encoded using the IWCP mode.

The implementations of the present disclosure provide the intra prediction method in which the codec can determine two different prediction blocks of the current block using two different intra angular prediction modes, and then combine the two different prediction blocks by various weight matrices to obtain the more complex prediction block. In this way, while improving the accuracy of intra prediction, the cost of hardware implementation can be reduced, and a simple and efficient coding method can be achieved, thus improving the compression performance.

Figure 10:
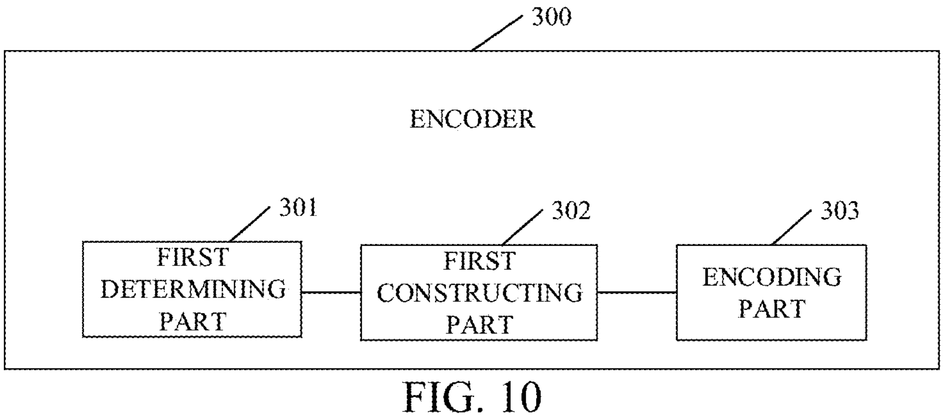
FIG. 10 is a first schematic structural diagram of an encoder provided in implementations of the disclosure.

Based on the above implementations, in another implementations of the disclosure, FIG. 10 is a first schematic structural diagram of an encoder provided in the implementations of the disclosure. As illustrated in FIG. 10, the encoder 300 provided in the implementations of the disclosure may include a first determining part 301, a first constructing part 302, and an encoding part 303.

The first determining part 301 is configured to determine a first intra prediction mode and a second intra prediction mode of the current block when an IWCP mode is used for a current block, where the first intra prediction mode and the second intra prediction mode are two different intra angular prediction.

The first constructing part 302 is configured to construct an MPM list for current block.

The first determining part 301 is further configured to determine a first mode index and a second mode index of the current block are determined according to the first intra prediction mode, the second intra prediction mode, and the MPM list.

The encoding part 303 is configured to signal the first mode index and the second mode index into the bitstream.

Figure 11:
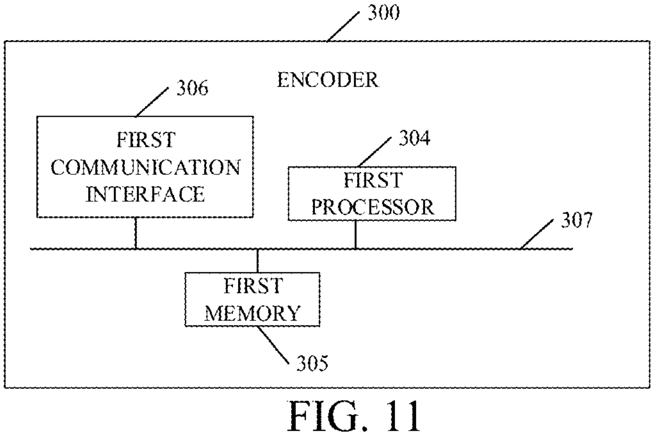
FIG. 11 is a second schematic structural diagram of an encoder provided in implementations of the disclosure.

FIG. 11 is a second schematic block diagram of an encoder provided in implementations of the disclosure. As illustrated in FIG. 11, the encoder 300 provided in this disclosure may include a first processor 304, a first memory 305 storing instructions executable by the first processor 304, a first communication interface 306, and a first bus 307 for connecting the first processor 304, the first memory 305, and the first communication interface 306.

Further, in implementations of the disclosure, the first processor 304 is configured to determine a first intra prediction mode and a second intra prediction mode of the current block when an IWCP mode is used for a current block, where the first intra prediction mode and the second intra prediction mode are two different intra angular prediction; construct an MPM list for current block; determine a first mode index and a second mode index of the current block are determined according to the first intra prediction mode, the second intra prediction mode, and the MPM list; and signal the first mode index and the second mode index into the bitstream.

Figure 12:
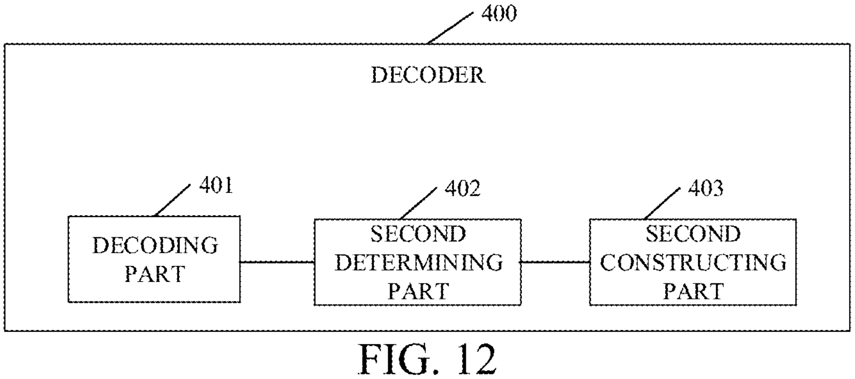
FIG. 12 is a first schematic structural diagram of a decoder provided in implementations of the disclosure.

FIG. 12 is a first schematic structural diagram of a decoder provided in the implementations of the disclosure. As illustrated in FIG. 12, the decoder 400 provided in the implementations of the disclosure may include a decoding part 401, a second determining part 402, and the second constructing part 403.

The decoding part 401 is configured to decode a bitstream.

The second determining part 402 is configured to determine an intra prediction mode parameter of a current block, and when the intra prediction mode parameter indicates that the IWCP mode is used for the current block to determine an intra prediction value of the current block, determine a first mode index and a second mode index of the current block.

The second constructing part 403 is configured to construct an MPM list for current block.

The second determining part 402 is further configured to determine a first intra prediction mode and a second intra prediction mode of the current block according to the first mode index, the second mode index, and the MPM list, where the first intra prediction mode and the second intra prediction mode are two different intra angular prediction modes; determine a weight matrix for the current block; and determine a prediction value of the current block based on the first intra prediction mode, the second intra prediction mode, and the weight matrix.

Figure 13:
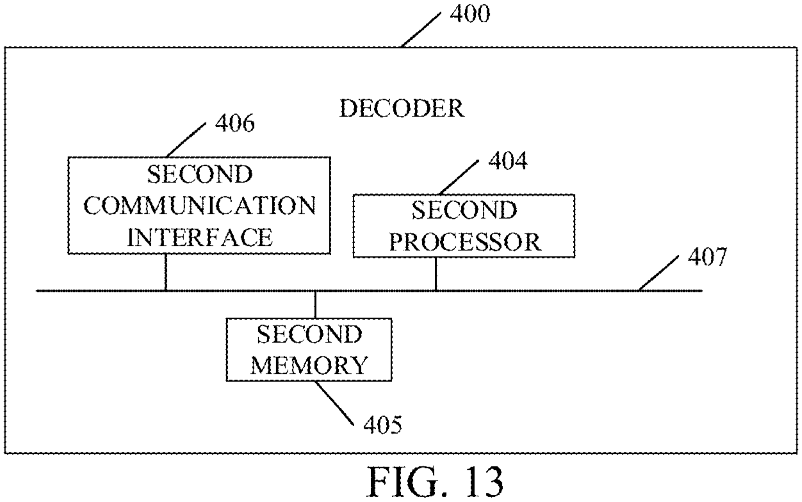
FIG. 13 is a second schematic structural diagram of a decoder provided in implementations of the disclosure.

FIG. 13 is a second schematic block diagram of a decoder provided in implementations of the disclosure. As illustrated in FIG. 13, the decoder 400 provided in this disclosure may include a second processor 404, a second memory 405 storing instructions executable by the second processor 404, a second communication interface 406, and a second bus 407 for connecting the second processor 404, the second memory 405, and the second communication interface 406.

Further, in implementations of the disclosure, the second processor 404 is configured to: decode a bitstream to determine an intra prediction mode parameter of a current block; when the intra prediction mode parameter indicates that the IWCP mode is used for the current block to determine an intra prediction value of the current block, determine a first mode index and a second mode index of the current block; configured to construct an MPM list for current block; determine a first intra prediction mode and a second intra prediction mode of the current block according to the first mode index, the second mode index, and the MPM list, where the first intra prediction mode and the second intra prediction mode are two different intra angular prediction modes; determine a weight matrix for the current block; and determine a prediction value of the current block based on the first intra prediction mode, the second intra prediction mode, and the weight matrix.

Additionally, the functional modules in the implementations may be integrated in a single processing unit, or each unit may be physically present separately, or two or more units may be integrated in a single unit. The above integrated units can be implemented either in the form of hardware or in the form of software functional modules.

The integrated unit, when implemented as a software function module and not sold or used as a stand-alone product, may be stored in a computer-readable storage medium, based on the understanding that the technical solution of the present disclosure, or that part or all or part of the technical solution that essentially contributes to the prior art, may be embodied in the form of a software product that is stored in a storage medium including a number of instructions to enable a computer device (which may be a personal computer, server, or network device, etc.) or processor to perform all or some of the steps of the method of this disclosure. The aforementioned storage media includes: USB flash drives, removable hard drives, read only memory (ROM), random access memory (RAM), disks or CD-ROMs, and other media that can store program codes.

Implementations of the disclosure provide the encoder and the decoder. The decoder decode a bitstream to determine an intra prediction mode parameter of a current block; when the intra prediction mode parameter indicates that the IWCP mode is used for the current block to determine an intra prediction value of the current block, determine a first mode index and a second mode index of the current block; configured to construct an MPM list for current block; determine a first intra prediction mode and a second intra prediction mode of the current block according to the first mode index, the second mode index, and the MPM list, where the first intra prediction mode and the second intra prediction mode are two different intra angular prediction modes; determine a weight matrix for the current block; and determine a prediction value of the current block based on the first intra prediction mode, the second intra prediction mode, and the weight matrix. When an IWCP mode is used for a current block to determine intra prediction mode of the current block, the encoder determines a first intra prediction mode and a second intra prediction mode of the current block, where the first intra prediction mode and the second intra prediction mode are two different intra angular prediction modes; constructs the MPM list for the current block; determines the first mode index and the second mode index of the current block according to the first intra prediction mode, the second intra prediction mode, and the MPM list; and signals the first mode index and the second mode index into the bitstream. That is, in the implementations of the present disclosure, the encoder and the decoder can determine two different prediction blocks of the current block using two different intra angular prediction modes, and then combine the two different prediction blocks by various weight matrices to obtain the more complex prediction block. In this way, while improving the accuracy of intra prediction, the cost of hardware implementation can be reduced, and a simple and efficient coding method can be achieved, thus improving the compression performance.

Implementations of the disclosure provide a computer-readable storage medium having stored thereon a program that when executed by a processor implements the method as described in the above implementations.

Specifically, the program instructions corresponding to the intra prediction method in the implementations may be stored on a storage medium such as a CD-ROM, a hard drive, a USB flash drive, etc., and when the program instructions corresponding to the intra prediction method in the storage medium are read or executed by an electronic device, the following operations are executed.

A bitstream is decoded to determine an intra prediction mode parameter of a current block. When the intra prediction mode parameter indicates that an IWCP mode is used for determining an intra prediction value of the current block, a first mode index and a second mode index of the current block are determined. An MPM list for the current block is constructed. A first intra prediction mode and a second intra prediction mode of the current block are determined according to the first mode index, the second mode index, and the MPM list. The first intra prediction mode and the second intra prediction mode are two different intra angular prediction modes. A weight matrix for the current block is determined. A prediction value of the current block is determined based on the first intra prediction mode, the second intra prediction mode, and the weight matrix.

The following operations are further performed.

When the IWCP mode is used for determining the intra prediction value of the current block, the first intra prediction mode and the second intra prediction mode of the current block are determined. The first intra prediction mode and the second intra prediction mode are two different intra angular prediction modes. The MPM list for the current block is constructed. The first mode index and the second mode index of the current block are determined according to the first intra prediction mode, the second intra prediction mode, and the MPM list. The first mode index and the second mode index are signalled into a bitstream.

It should be appreciated by those skilled in the art that implementations of the present disclosure may be provided as methods, systems, or computer program products. Thus, the present disclosure may take the form of hardware implementations, software implementations, or implementations that combine software and hardware aspects. Further, the present disclosure may take the form of a computer program product implemented on one or more computer-usable storage media (including, but not limited to, disk memory and optical memory, etc.) that contain computer-usable program code therein.

The present disclosure is described with reference to implementation flowcharts and/or block diagrams of methods, devices (systems), and computer program products according to implementations of the present disclosure. It should be understood that each of the flows and/or blocks in the flowcharts and/or block diagrams, as well as combinations of the flows and/or blocks in the flowcharts and/or block diagrams, may be implemented by computer program instructions. These computer program instructions may be provided to a processor of a general-purpose computer, a special-purpose computer, an embedded processor, or other programmable data processing device to produce a machine such that the instructions executed by the processor of the computer or other programmable data processing device produce a device for carrying out the functions specified in one or more flows in the flowcharts and/or one or more blocks in the block diagrams.

These computer program instructions may also be stored in a computer-readable memory capable of directing the computer or other programmable data processing device to operate in a particular manner, such that the instructions stored in the computer-readable memory produce a product of manufacture including an instruction device that implements functions specified in one or more flows in the flowcharts and/or one or more blocks in the block diagrams.

These computer program instructions may also be loaded onto the computer or other programmable data processing device such that a series of operations are performed on the computer or other programmable device to produce computer-implemented processing, such that the instructions executed on the computer or other programmable device provide instructions for implementing the functions specified in one or more flows in the flowcharts and/or one or more blocks in the block diagrams.

The foregoing is merely some implementations of the present disclosure and is not intended to limit the scope of protection of the present disclosure.

INDUSTRIAL APPLICABILITY

The implementations of the disclosure provide the intra prediction method, the encoder, the decoder, and the storage medium. The decoder decodes a bitstream to determine an intra prediction mode parameter of a current block. When the intra prediction mode parameter indicates that an IWCP mode is used for determining an intra prediction value of the current block, a first mode index and a second mode index of the current block are determined. An MPM list for the current block is constructed. A first intra prediction mode and a second intra prediction mode of the current block are determined according to the first mode index, the second mode index, and the MPM list. The first intra prediction mode and the second intra prediction mode are two different intra angular prediction modes. A weight matrix for the current block is determined. A prediction value of the current block is determined based on the first intra prediction mode, the second intra prediction mode, and the weight matrix. When the IWCP mode is used for determining the intra prediction value of the current block, the encoder determines the first intra prediction mode and the second intra prediction mode of the current block. The first intra prediction mode and the second intra prediction mode are two different intra angular prediction modes. The MPM list for the current block is constructed. The first mode index and the second mode index of the current block are determined according to the first intra prediction mode, the second intra prediction mode, and the MPM list. The first mode index and the second mode index are signalled into a bitstream. That is to say, in the implementations of the disclosure, the encoder and the decoder can determine two different prediction blocks of the current block through two different intra angular prediction modes, and then combine the two prediction blocks using various weight matrices to obtain a more complex prediction block, which can improve accuracy of intra prediction while reducing the cost and complexity of hardware implementation, enabling a simple and efficient coding method, thus enhancing compression performance.

What is claimed is:

1. An intra prediction method, applied to a decoder and comprising:

decoding a bitstream to determine an intra prediction mode parameter of a current block;

deriving both a first mode index and a second mode index of the current block from the bitstream when the intra prediction mode parameter indicates that an intra weighted combined prediction mode is used for determining an intra prediction value of the current block;

constructing a most probable mode (MPM) list for the current block, wherein the MPM list is constructed based on a filtered candidate mode obtained by filtering a first candidate mode based on a preset angular prediction mode set, wherein the first candidate mode is determined according to a prediction mode of a neighbouring block of the current block;

determining a first intra prediction mode and a second intra prediction mode of the current block according to the first mode index, the second mode index, and the MPM list, wherein the first intra prediction mode and the second intra prediction mode are two different intra angular prediction modes;

determining a weight matrix derivation mode of the current block, and determining a weight matrix for the current block according to the weight matrix derivation mode; and determining a prediction value of the current block based on the first intra prediction mode, the second intra prediction mode, and the weight matrix.

2. The method of claim 1, wherein constructing the MPM list for the current block comprises:

determining a second candidate mode according to the weight matrix derivation mode; and constructing the MPM list based on the first candidate mode, the second candidate mode, and the preset angular prediction mode set.

3. The method of claim 2, wherein:

determining the second candidate mode according to the weight matrix derivation mode comprises:

determining a boundary line angle index according to the weight matrix derivation mode; and determining the second candidate mode according to the boundary line angle index.

4. The method of claim 2, wherein constructing the MPM list based on the first candidate mode, the second candidate mode, and the preset angular prediction mode set comprises:

obtaining the filtered candidate mode by filtering the first candidate mode based on the preset angular prediction mode set; and constructing the MPM list according to the filtered candidate mode and the second candidate mode;

wherein obtaining the filtered candidate mode by filtering the first candidate mode based on the preset angular prediction mode set comprises:

determining the first candidate mode as the filtered candidate mode when the first candidate mode belongs to the preset angular prediction mode set; and determining a substitute mode of the first candidate mode from the preset angular prediction mode set and determining the substitute mode as the filtered candidate mode, when the first candidate mode is an intra angular prediction mode and does not belong to wherein the preset angular prediction mode set; and wherein the first candidate mode is not added into the MPM list when the first candidate mode is not an intra angular prediction mode.

5. The method of claim 2, wherein constructing the MPM list based on the first candidate mode, the second candidate mode, and the preset angular prediction mode set comprises:

adding the filtered candidate mode into the MPM list when the filtered candidate mode meets a preset addition condition; and adding the second candidate mode into the MPM list when the MPM list does not reach a preset list length L and the second candidate mode meets the preset addition condition, wherein L is an integer greater than or equal to 1.

6. The method of claim 5, further comprising:

determining that the filtered candidate mode meets the preset addition condition when the filtered candidate mode is different from all prediction modes in the MPM list; and determining that the second candidate mode meets the preset addition condition when the second candidate mode is different from all prediction modes in the MPM list.

7. The method of claim 5, further comprising:

determining a first mapping table between index values and binary strings, wherein the first mapping table comprises a binary string with a first length, a binary string with a second length, and a binary string with a third length;

wherein the binary string with the first length is used for the prediction modes in the MPM list; and wherein the binary string with the second length and the binary string with the third length are used for prediction modes in the preset angular prediction mode set and not included in the MPM list.

8. The method of claim 7, wherein determining the first intra prediction mode and the second intra prediction mode of the current block according to the first mode index, the second mode index, and the MPM list comprises:

determining a value i of the first mode index according to the first mapping table;

determining an angular prediction mode with an index i in the MPM list as the first intra prediction mode when $i \geq 0$ and $i < L$; and determining the first intra prediction mode according to the preset angular prediction mode set and the MPM list when $i \geq L$.

9. The method of claim 1, further comprising:

prediction modes in the MPM list are each an intra angular prediction mode.

10. The method of claim 1, wherein determining the prediction value of the current block based on the first intra prediction mode, the second intra prediction mode, and the weight matrix comprises:

determining a first prediction value of the current block according to the first intra prediction mode, and determining a second prediction value of the current block according to the second intra prediction mode; and obtaining a prediction value of the current block by weighting the first prediction value and the second prediction value with the weight matrix.

11. An intra prediction method, applied to an encoder and comprising:

determining a first intra prediction mode and a second intra prediction mode of a current block when an intra weighted combined prediction mode is used for determining an intra prediction value of the current block, the first intra prediction mode and the second intra prediction mode being two different intra angular prediction modes;

determining a weight matrix derivation mode of the current block, and determining a weight matrix for the current block according to the weight matrix derivation mode;

constructing a most probable mode (MPM) list for the current block, wherein the MPM list is constructed based on a filtered candidate mode obtained by filtering a first candidate mode based on a preset angular prediction mode set, wherein the first candidate mode is determined according to a prediction mode of a neighbouring block of the current block;

determining a prediction value of the current block according to the first intra prediction mode, the second intra prediction mode, and the weight matrix;

determining a first mode index and a second mode index of the current block according to the first intra prediction mode, the second intra prediction mode, and the MPM list; and signalling the first mode index and the second mode index into a bitstream.

12. The method of claim 11, wherein constructing the MPM list for the current block comprises:

determining a second candidate mode according to the weight matrix derivation mode; and constructing the MPM list based on the first candidate mode, the second candidate mode, and the preset angular prediction mode set.

13. The method of claim 12, wherein determining the first candidate mode according to the prediction mode of the neighbouring block comprises:

determining the second candidate mode according to the weight matrix derivation mode comprises:

determining a boundary line angle index according to the weight matrix derivation mode; and determining the second candidate mode according to the boundary line angle index.

14. The method of claim 12, wherein constructing the MPM list based on the first candidate mode, the second candidate mode, and the preset angular prediction mode set comprises:

obtaining the filtered candidate mode by filtering the first candidate mode based on the preset angular prediction mode set; and constructing the MPM list according to the filtered candidate mode and the second candidate mode;

wherein obtaining the filtered candidate mode by filtering the first candidate mode based on the preset angular prediction mode set comprises:

determining the first candidate mode as the filtered candidate mode when the first candidate mode belongs to the preset angular prediction mode set; and determining a substitute mode of the first candidate mode from the preset angular prediction mode set and determining the substitute mode as the filtered candidate mode, when the first candidate mode is an intra angular prediction mode and does not belong to the preset angular prediction mode set;

wherein the first candidate mode is not added into the MPM list when the first candidate mode is not an intra angular prediction mode.

15. The method of claim 12, wherein constructing the MPM list based on the first candidate mode, the second candidate mode, and the preset angular prediction mode set comprises:

adding the filtered candidate mode into the MPM list when the filtered candidate mode meets a preset addition condition; and adding the second candidate mode into the MPM list when the MPM list does not reach a preset list length L and the second candidate mode meets the preset addition condition, wherein L is an integer greater than or equal to 1.

16. The method of claim 15, further comprising:

determining a first mapping table between index values and binary strings, wherein the first mapping table comprises a binary string with a first length, a binary string with a second length, and a binary string with a third length;

wherein the binary string with the first length is used for the prediction modes in the MPM list; and wherein the binary string with the second length and the binary string with the third length are used for prediction modes in the preset angular prediction mode set and not included in the MPM list.

17. The method of claim 11, wherein determining the prediction value of the current block based on the first intra prediction mode, the second intra prediction mode, and the weight matrix comprises:

determining a first prediction value of the current block according to the first intra prediction mode, and determining a second prediction value of the current block according to the second intra prediction mode; and obtaining the prediction value of the current block by weighting the first prediction value and the second prediction value with the weight matrix.

18. A decoder, comprising:

a processor and a memory storing instructions which, when executed by the processor, cause the processor to:

decode a bitstream to determine an intra prediction mode parameter of a current block;

derive both a first mode index and a second mode index of the current block from the bitstream when the intra prediction mode parameter indicates that an intra weighted combined prediction mode is used for determining an intra prediction value of the current block;

construct a most probable mode (MPM) list for the current block, wherein the MPM list is constructed based on a filtered candidate mode obtained by filtering a first candidate mode based on a preset angular prediction mode set, wherein the first candidate mode is determined according to a prediction mode of a neighbouring block of the current block;

determine a first intra prediction mode and a second intra prediction mode of the current block according to the first mode index, the second mode index, and the MPM list, wherein the first intra prediction mode and the second intra prediction mode are two different intra angular prediction modes;

determine a weight matrix derivation mode of the current block, and determine a weight matrix for the current block according to the weight matrix derivation mode;

determine a prediction value of the current block based on the first intra prediction mode, the second intra prediction mode, and the weight matrix.

* * * * *